United States Patent
Raviv et al.

(10) Patent No.: US 11,443,554 B2
(45) Date of Patent: Sep. 13, 2022

(54) DETERMINING AND PRESENTING USER EMOTION

(71) Applicant: VERIZON PATENT AND LICENSING INC., Basking Ridge, NJ (US)

(72) Inventors: Ariel Raviv, Haifa (IL); Joel Oren, Tel Aviv (IL); Irena Grabovitch-Zuyev, Nahariya (IL)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 344 days.

(21) Appl. No.: 16/532,621

(22) Filed: Aug. 6, 2019

(65) Prior Publication Data

US 2021/0042507 A1 Feb. 11, 2021

(51) Int. Cl.

| | |
|---|---|
| *G06V 40/16* | (2022.01) |
| *G06T 13/40* | (2011.01) |
| *G10L 25/57* | (2013.01) |
| *G10L 25/63* | (2013.01) |
| *G06V 20/40* | (2022.01) |
| *G06V 40/20* | (2022.01) |

(52) U.S. Cl.
CPC ............ *G06V 40/174* (2022.01); *G06T 13/40* (2013.01); *G06V 20/40* (2022.01); *G06V 40/165* (2022.01); *G06V 40/20* (2022.01); *G10L 25/57* (2013.01); *G10L 25/63* (2013.01)

(58) Field of Classification Search
None
See application file for complete search history.

(56) References Cited

U.S. PATENT DOCUMENTS

| | | | |
|---|---|---|---|
| 2005/0209848 A1* | 9/2005 | Ishii | H04M 3/42221 704/231 |
| 2007/0033534 A1* | 2/2007 | Kim | H04N 7/141 715/758 |
| 2007/0140532 A1* | 6/2007 | Goffin | G06K 9/00288 382/118 |
| 2012/0290508 A1* | 11/2012 | Bist | G06F 16/437 706/10 |
| 2015/0070516 A1* | 3/2015 | Shoemake | H04N 21/44008 348/207.11 |
| 2017/0310927 A1* | 10/2017 | West | G06T 13/80 |
| 2019/0251359 A1* | 8/2019 | Pranger | G06V 40/174 |
| 2020/0075039 A1* | 3/2020 | Eleftheriou | G06K 9/00892 |
| 2020/0125647 A1* | 4/2020 | Mintz | G06Q 50/01 |

* cited by examiner

*Primary Examiner* — Michelle M Entezari

(57) ABSTRACT

One or more computing devices, systems, and/or methods are provided. One or more videos associated with a user may be analyzed to determine a first set of features of the user associated with a first emotion of the user and/or a second set of features of the user associated with a second emotion of the user. A first user emotion profile associated with the user may be generated based upon the first set of features and/or the second set of features. A second video may be presented via a graphical user interface of a first client device. The user may be identified within the second video. It may be determined, based upon the second video and/or the first user emotion profile, that the user is associated with the first emotion. A representation of the first emotion may be displayed via the graphical user interface of the first client device.

20 Claims, 13 Drawing Sheets

DETERMINING AND PRESENTING USER EMOTION

BACKGROUND

Services, such as websites, applications, etc. may provide communication platforms for performing communications between users, such as via video communication sessions (e.g., video calls, video conference calls, etc.). For example, a first user may communicate with one or more users via a video communication session.

SUMMARY

In accordance with the present disclosure, one or more computing devices and/or methods are provided. In an example, one or more first videos associated with a first user may be analyzed to determine a first set of features of the first user associated with a first emotion of the first user and/or a second set of features of the first user associated with a second emotion of the first user. The first set of features may comprise a first set of visual features of the first user and/or a first set of audio features of the first user. The second set of features may comprise a second set of visual features of the first user and/or a second set of audio features of the first user. A first user emotion profile associated with the first user may be generated based upon the first set of features and/or the second set of features. A second video may be presented via a graphical user interface of a first client device. The first user may be identified within the second video. It may be determined, based upon the second video and/or the first user emotion profile, that the first user is associated with the first emotion. A representation of the first emotion may be displayed via the graphical user interface of the first client device.

In an example, one or more first videos associated with a first user may be analyzed to determine a first set of features of the first user associated with a first emotion of the first user and/or a second set of features of the first user associated with a second emotion of the first user. The first set of features may comprise a first set of visual features of the first user and/or a first set of audio features of the first user. The second set of features may comprise a second set of visual features of the first user and/or a second set of audio features of the first user. A first user emotion profile associated with the first user may be generated based upon the first set of features and/or the second set of features.

In an example, a first user emotion profile associated with a first user may be received. The first user emotion profile may comprise a first set of features of the first user associated with a first emotion of the first user and/or a second set of features of the first user associated with a second emotion of the first user. The first set of features may comprise a first set of visual features of the first user and/or a first set of audio features of the first user. The second set of features may comprise a second set of visual features of the first user and/or a second set of audio features of the first user. A first video may be presented via a graphical user interface of a first client device. The first user may be identified within the first video. It may be determined, based upon the first video and/or the first user emotion profile, that the first user is associated with the first emotion. A representation of the first emotion may be displayed via the graphical user interface of the first client device.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
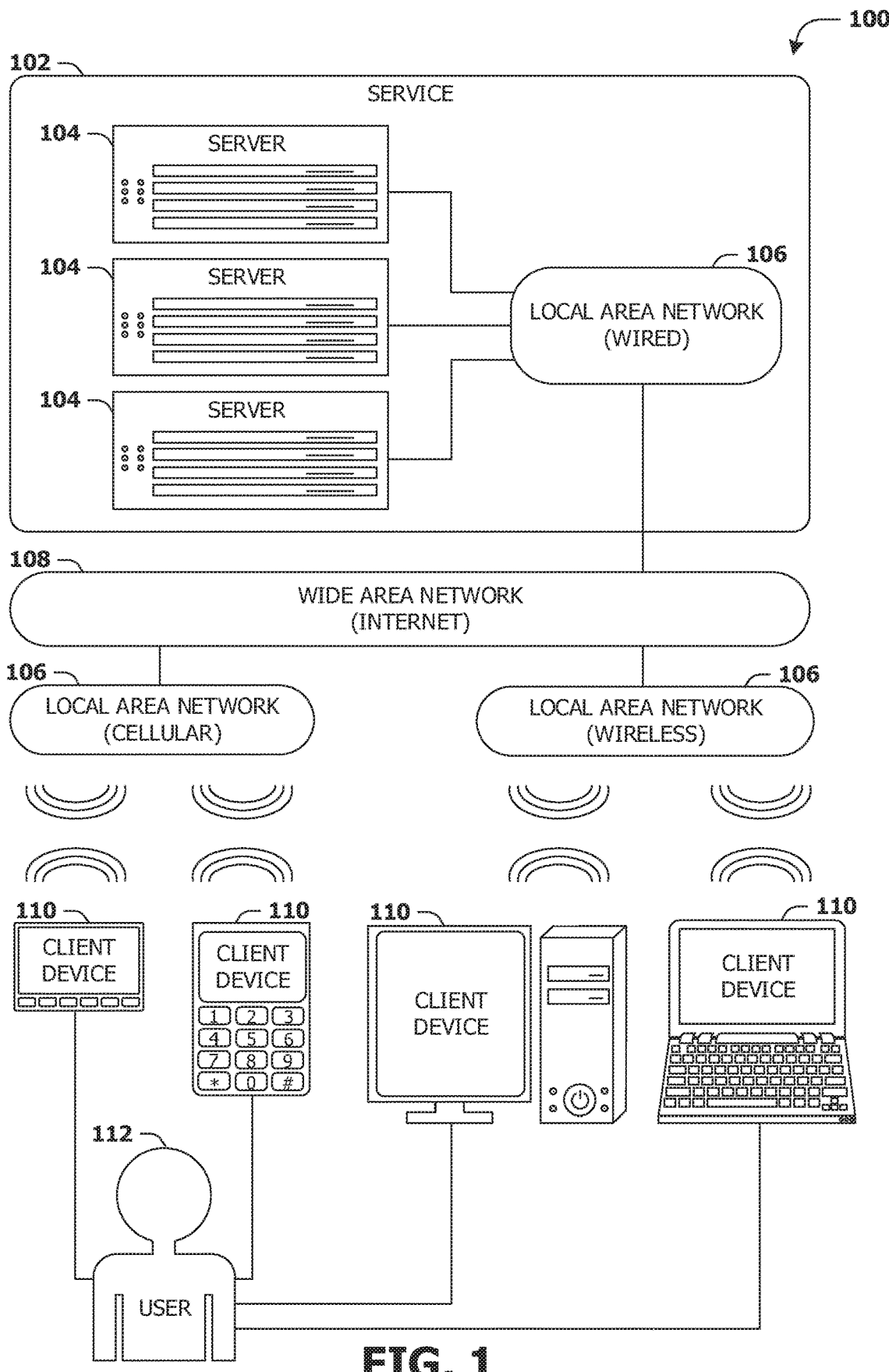
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
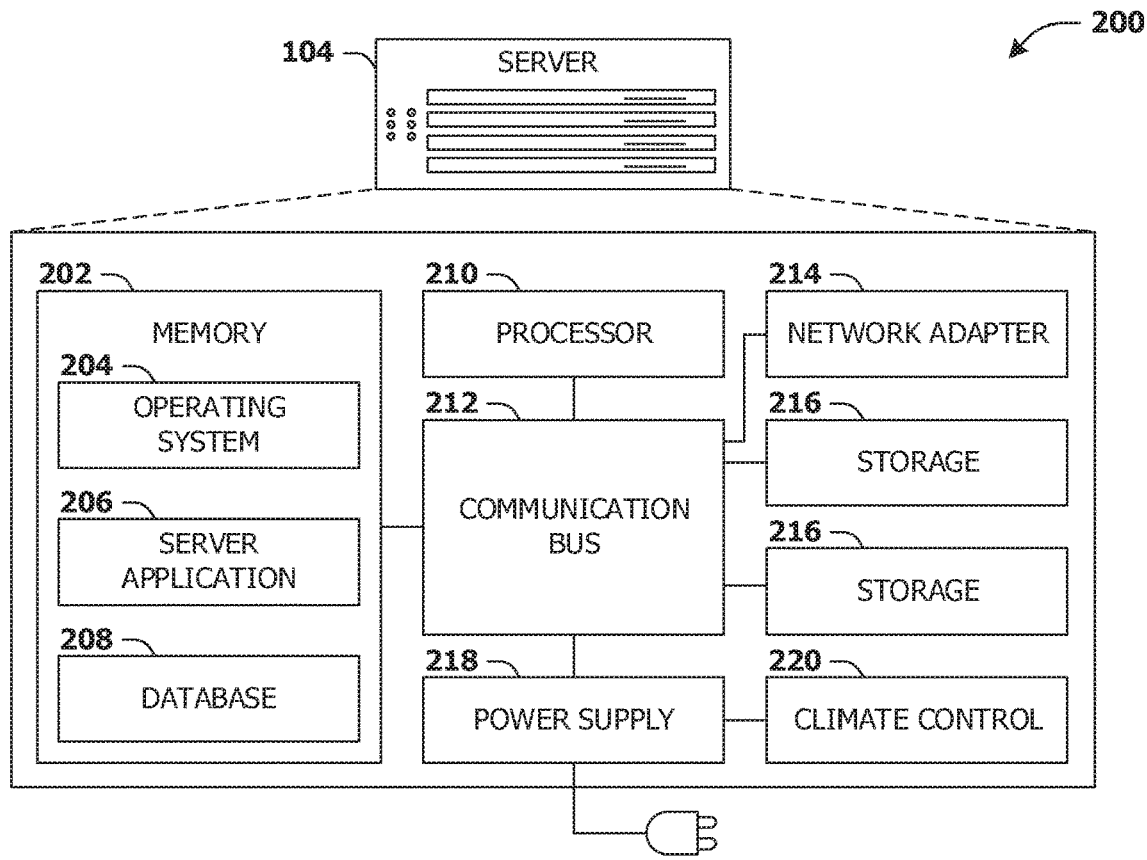
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
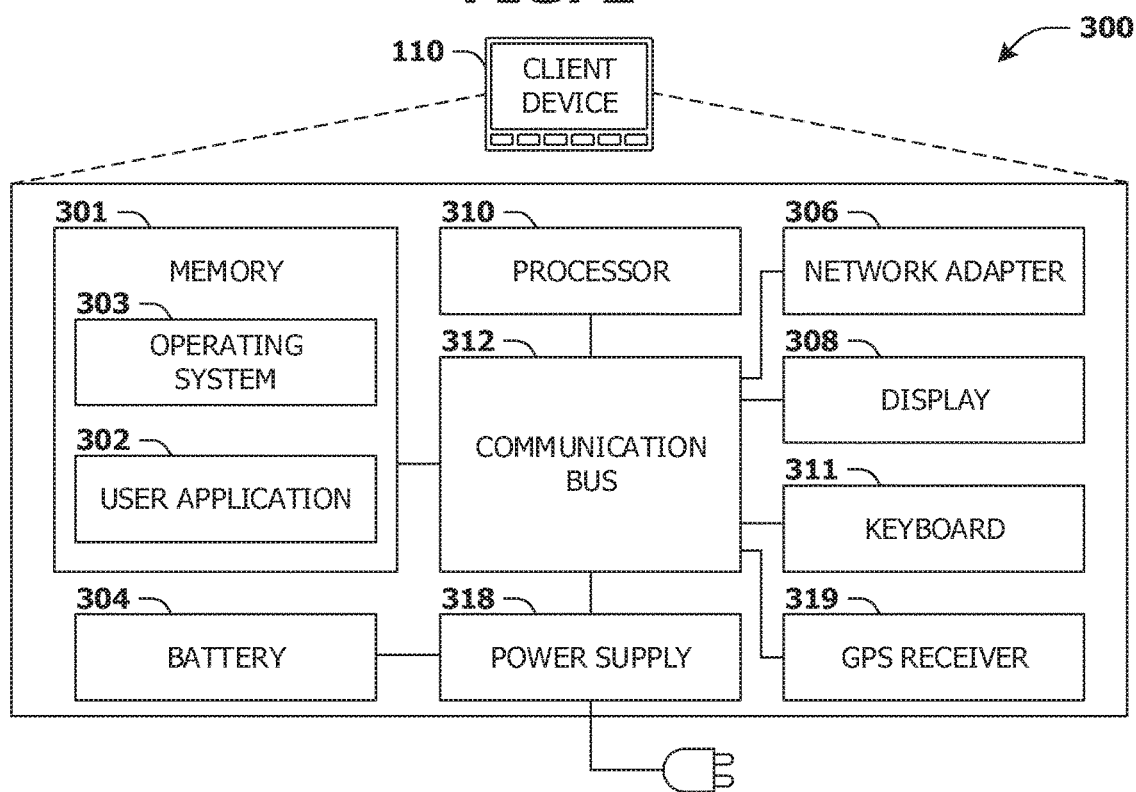
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for determining an emotion of a user and/or presenting a representation of the emotion are provided. For example, a first user (and/or a first client device associated with the first user) may access and/or interact with a service, such as a browser, software, a website, an application, an operating system, etc. that provides a communication platform for communicating with one or more users via one or more of video calls, video conference calls, voice calls, voice conference calls, instant messaging, etc. For example, the first user may use the communication platform to communicate with a second user via a video call. However, due to a lack of familiarity between the first user and the second user, cultural differences between the first user and the second user and/or inadequate verbal feedback expressed by the first user and/or the second user, misunderstandings and/or lost productivity may occur in the video call, which may be detrimental to a relationship between the first user and the second user.

Thus, in accordance with one or more of the techniques presented herein, one or more first videos associated with the second user may be analyzed to determine a first set of features associated with a first emotion of the first user and/or a second set of features associated with a second emotion of the first user. The first set of features may comprise a first set of visual features of the first user and/or a first set of audio features of the first user. Alternatively and/or additionally, the second set of features may comprise a second set of visual features of the first user and/or a second set of audio features of the first user. A first user emotion profile associated with the first user may be generated based upon the first set of features and/or the second set of features. During the video call, a first video of the first user (recorded via a camera of the first client device) may be displayed via a second client device associated with the second user. Alternatively and/or additionally, a second video of the second user (recorded via a camera of the second client device) may be displayed via the first client device associated with the first user. In some examples, the first user may be identified within the second video. Alternatively and/or additionally, it may be determined that the first user is associated with the first emotion based upon the second video and/or the first user emotion profile. A representation of the first emotion may be displayed via the second client device (e.g., the representation of the first emotion may be indicative of the first user being one or more of happy, sad, excited, etc.). Accordingly, the second user may use the representation of the first emotion as feedback and/or the second user may converse with the first user based upon the representation of the first emotion.

Figure 4:
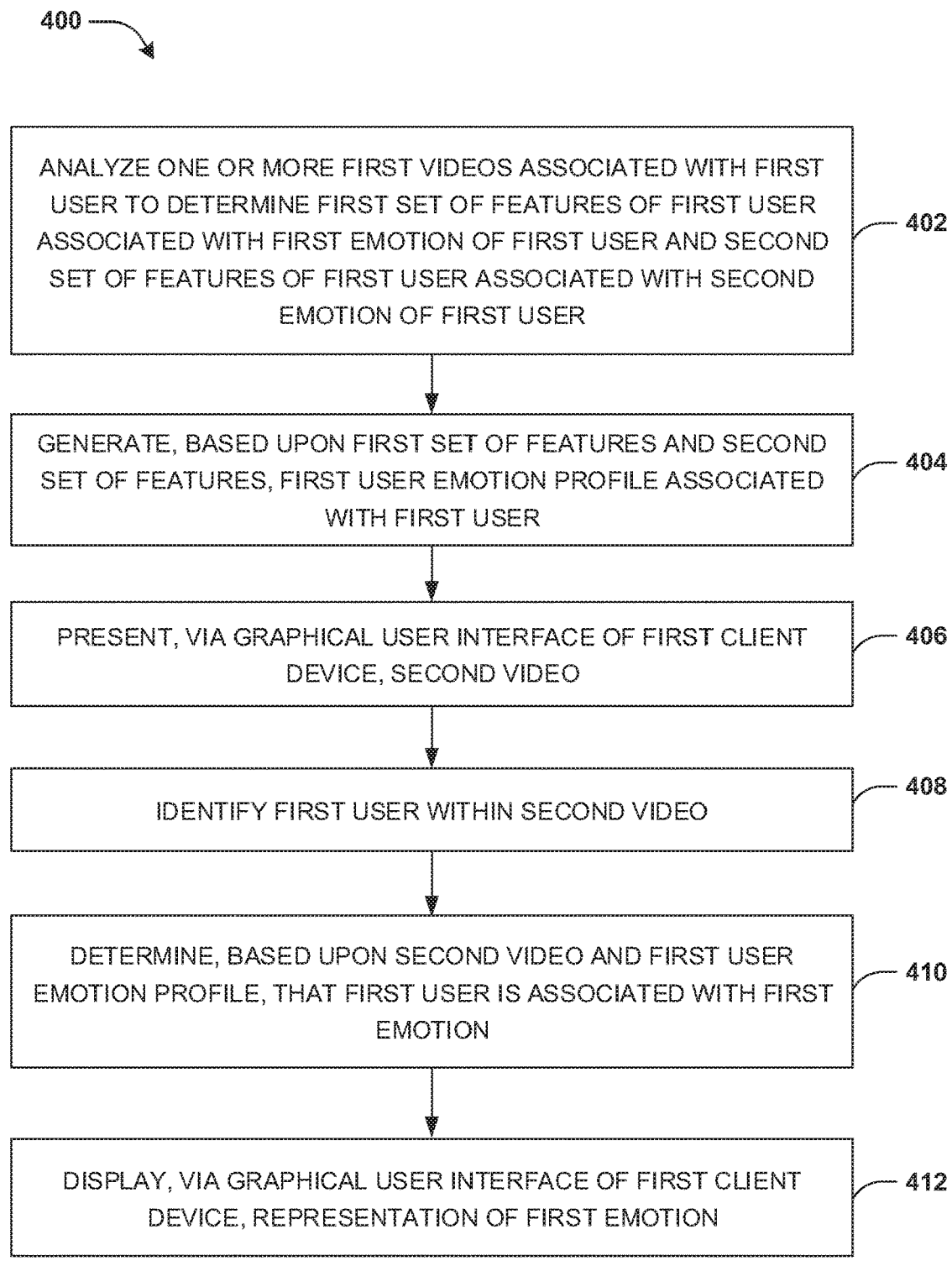
FIG. 4 is a flow chart illustrating an example method for determining an emotion of a user and/or presenting a representation of the emotion.

An embodiment of determining an emotion of a user and/or presenting a representation of the emotion is illustrated by an example method 400 of FIG. 4. A first user, such as user Jill, (and/or a first client device associated with the first user) may access and/or interact with a communication service, such as a browser, software, a website, an application, an operating system, etc. that provides a communication platform for communicating with one or more users via one or more of video calls, video conference calls, voice calls, voice conference calls, instant messaging, etc.

At 402, one or more first videos associated with the first user may be analyzed to determine a first set of features of the first user associated with a first emotion of the first user and/or a second set of features of the first user associated with a second emotion of the first user. In some examples, the first set of features may comprise a first set of visual features of the first user and/or a first set of audio features of the first user. Alternatively and/or additionally, the second set of features comprises a second set of visual features of the first user and/or a second set of audio features of the first user.

For example, the one or more first videos associated with the first user may be analyzed to determine a plurality of sets of features of the first user associated with a plurality of emotions of the first user. A set of features of the plurality of sets of features may be associated with an emotion of the plurality of emotions of the first user. Alternatively and/or additionally, a set of features of the plurality of sets of features may comprise a set of visual features of the first user and/or a set of audio features of the first user. In some examples, the plurality of sets of features may comprise the first set of features associated with the first emotion of the first user and/or the second set of features associated with the second emotion of the first user. Alternatively and/or additionally, the plurality of emotions may comprise the first emotion and/or the second emotion.

In some examples, a first video of the one or more first videos may correspond to a first real-time video received from the first client device associated with the first user. For example, the first video may be recorded (e.g., continuously recorded) by a first camera of the first client device. In some examples, the first video may comprise a real-time representation of a view of the first camera. In some examples, the first client device (e.g., a laptop, a smartphone, a tablet, a wearable device, etc.) may comprise the first camera (e.g., the first camera may be mounted on and/or embedded in the laptop, the smartphone and/or the wearable device). Alternatively and/or additionally, the first camera may be a standalone camera (e.g., the first camera may be a security camera and/or a different type of camera, such as a webcam and/or an external camera, that may or may not be mounted on the first client device). The first camera may be connected to the first client device via a wired connection. Alternatively and/or additionally, the first camera may be connected to the first client device via a wireless connection.

In some examples, the first video may be recorded responsive to the first camera being activated and/or receiving a record request to start recording the first video. For example, the first video may be recorded responsive to receiving a selection of a record selectable input corresponding to the record request. The selection of the record selectable input may be received via a camera interface of the first client device. Alternatively and/or additionally, the record request may be received responsive to a selection of a record button, corresponding to recording a video, on the first camera and/or the first client device. Alternatively and/or additionally, the record request may be received via one or more of a conversational interface of the first client device where a voice command indicative of the record request may be received via a microphone of the first client device, a touchscreen of the first client device, one or more buttons of the first client device, etc.

In some examples, the first video may correspond to a first video communication session performed using the communication service. For example, the first video communication session may correspond to a video call and/or a video conference call between multiple users. For example, the first video may be recorded responsive receiving a request to perform a video communication (e.g., a request to perform a video call and/or a video conference call). In some examples, the first video may be received from the first client device. Alternatively and/or additionally, during the first video communication session, the first video may be presented via a second client device associated with the first video communication session. Alternatively and/or additionally, a second video may be received from the second client device. During the first video communication session, the second video may be displayed via the first client device. In some examples, the first user may converse with the second user via the first video communication session.

The first user may be identified and/or detected within the first video. In some examples, the first user may be identified based upon a determination that the first video is recorded using the first client device (and/or the first camera) and/or a determination that the first client device (and/or the first camera) is associated with the first user. Alternatively and/or additionally, the first user may be identified based upon a determination that the first client device is associated with a first user account associated with the first user (e.g., the first client device may be logged into the first user account associated with the first user). In an example where the first video corresponds to the first video communication session, the request to perform the video communication may comprise an indication of the first user account associated with the first user.

In some examples, the first video (and/or one or more video frames of the first video) may be analyzed to identify and/or detect an object within the first video. In some examples, the first video (and/or one or more video frames of the first video) may be analyzed using one or more object detection techniques (and/or one or more object segmentation techniques) to detect the object. Alternatively and/or additionally, the first video (and/or one or more video frames of the first video) may be analyzed using one or more machine learning techniques to detect the object. The object may correspond to a person.

In some examples, the object may be identified and/or detected using one or more object segmentation techniques and/or one or more image segmentation techniques. For example, a video frame of the first video may be segmented into multiple segments using the one or more object segmentation techniques and/or the one or more image segmentation techniques. The video frame may be segmented into the multiple segments based upon one or more of color differences between portions of the video frame, detected boundaries associated with the multiple segments, etc. In some examples, a segment of the multiple segments may be analyzed to identify the object.

In some examples, it may be determined that the object corresponds to the first user based upon one or more of the determination that the first video is recorded using the first client device, the determination that the first client device is associated with the first user, the determination that the first client device is associated with the first user account associated with the first user, etc. Alternatively and/or additionally, it may be determined that the object corresponds to the first user based upon a comparison of one or more stored visual features associated with the first user with the object (e.g., the object may be analyzed using one or more image analysis techniques and/or one or more facial recognition techniques based upon the one or more stored visual features associated with the first user to determine whether the object corresponds to the first user). Alternatively and/or additionally, it may be determined that the object corresponds to the first user based upon a comparison of one or more stored audio features associated with the first user with audio of the first video (e.g., sound produced by the object).

In some examples, it may be determined that the first user is associated with the first emotion within a first portion of the first video. For example, the first emotion may correspond to one or more of happiness, sadness, excitement, pleased, frustrated, anger, neutral, fear, disgust, surprised, boredom, confusion, interested, satisfaction, etc.

Alternatively and/or additionally, the first emotion may correspond to an emotion, a sentiment, an opinion, a feeling, a thought and/or a judgment of the first user towards (and/or about) one or more of the second user (that the first user is conversing with via the first video communication session), an opinion expressed by the second user, an action of the second user, a statement made by the second user, one or more events explained by the second user, etc. Alternatively and/or additionally, the first emotion may correspond to an intensity of an emotion, a sentiment, an opinion, a feeling, a thought and/or a judgment of the first user towards (and/or about) one or more of the second user, an opinion expressed by the second user, an action of the second user, a statement made by the second user, one or more events explained by the second user, etc. For example, the first emotion may correspond to a level of positivity of an emotion, a sentiment, an opinion, a feeling, a thought and/or a judgment of the first user towards (and/or about) one or more of the second user, an opinion expressed by the second user, an action of the second user, a statement made by the second user, one or more events explained by the second user, etc. (e.g., a level of favorability of an emotion, a sentiment, an opinion, a feeling, a thought and/or a judgment of the first user towards one or more of the second user, an opinion expressed by the second user, an action of the second user, a statement made by the second user, one or more events explained by the second user, etc.). Alternatively and/or additionally, the first emotion may correspond to a level of negativity of an emotion, a sentiment, an opinion, a feeling, a thought and/or a judgment of the first user towards (and/or about) one or more of the second user, an opinion expressed by the second user, an action of the second user, a statement made by the second user, one or more events explained by the second user, etc. (e.g., a level of unfavorability of an emotion, a sentiment, an opinion, a feeling, a thought and/or a judgment of the first user towards one or more of the second user, an opinion expressed by the second user, an action of the second user, a statement made by the second user, one or more events explained by the second user, etc.).

In an example, one or more of a first exemplary emotion of the plurality of emotions may correspond to a first level of positivity (and/or a first range of levels of positivity), a second exemplary emotion of the plurality of emotions may correspond to a second level of positivity (and/or a second range of levels of positivity), a third exemplary emotion of the plurality of emotions may correspond to a first level of negativity (and/or a first range of levels of negativity), a fourth exemplary emotion of the plurality of emotions may correspond to a second level of negativity (and/or a second range of levels of negativity), etc.

Alternatively and/or additionally, the first emotion may be indicative of a polarity of an emotion, a sentiment, an opinion, a feeling, a thought and/or a judgment of the first user towards one or more of the second user, an opinion expressed by the second user, an action of the second user, a statement made by the second user, one or more events explained by the second user, etc. For example, a first exemplary emotion of the plurality of emotions may be indicative of a positive emotion, sentiment, opinion, feeling, thought and/or judgment of the first user towards (and/or about) one or more of the second user, an opinion expressed by the second user, an action of the second user, a statement made by the second user, one or more events explained by the second user, etc. Alternatively and/or additionally, a second exemplary emotion of the plurality of emotions may be indicative of a negative emotion, sentiment, opinion, feeling, thought and/or judgment of the first user towards (and/or about) one or more of the second user, an opinion expressed by the second user, an action of the second user, a statement made by the second user, one or more events explained by the second user, etc.

In an example, during the first video communication session, the second user may say a joke that the first user deems funny. In the example, the first emotion may correspond to enthusiasm, enjoyment, happiness and/or a positive emotion, sentiment, opinion, feeling, thought and/or judgment of the first user towards the second user and/or the joke of the second user.

In another example, during the first video communication session, the second user may explain one or more events that the first user deems unfortunate (e.g., the one or more events may correspond to one or more of a decrease in a share price of a company, an error in manufacturing, etc.). In the example, the first emotion may correspond to frustration, disappointment, anger, sadness, nervousness and/or a negative emotion, sentiment, opinion, feeling, thought and/or judgment of the first user towards the second user and/or the one or more events explained by the second user.

In another example, during the first video communication session, the second user may pitch an entrepreneurial idea to the first user that the first user deems uninteresting and/or not likely to be successful (e.g., the first user may correspond to a potential investor for the second user). In the example, the first emotion may correspond to disappointment, boredom, a neutral emotion, sentiment, opinion, feeling, thought and/or judgment of the first user towards the second user and/or the entrepreneurial idea of the second user and/or a negative emotion, sentiment, opinion, feeling, thought and/or judgment of the first user towards the second user and/or the entrepreneurial idea of the second user.

In another example, during the first video communication session, the second user may say a statement and/or perform an action that the first user finds offensive (because of cultural differences and/or a lack of familiarity between the first user and the second user, for example). In the example, the first emotion may correspond to frustration, disappointment, anger, disgust and/or a negative emotion, sentiment, opinion, feeling, thought and/or judgment of the first user towards the second user, the statement the second user said and/or the action performed by the second user.

In another example, during the first video communication session, the second user may speak in such a way that the first user cannot understand (e.g., the second user may speak quickly using a language and/or the first user may not be able to understand the second user because the first user may not be fluent in the language spoken by the second user). In the example, the first emotion may correspond to confusion, frustration and/or a negative emotion, sentiment, opinion, feeling, thought and/or judgment of the first user towards the second user.

In some examples, it may be determined that the first user is associated with the first emotion within the first portion of the first video based upon sound of the first user associated with the first emotion within the first portion of the first video. For example, the sound may be produced by the first user. The sound may be detected by analyzing the first portion of the first video. The sound may comprise one or more of speech of the first user (e.g., the first user speaking), singing of the first user, laughing of the first user, crying of the first user, screaming of the first user, yelling of the first user, etc.

In an example where the sound comprises speech of the first user (e.g., the first user speaking), the speech may be transcribed to generate a transcription of the speech (e.g., the speech may be transcribed using one or more voice recognition techniques and/or transcription techniques). In some examples, the transcription may be compared with a plurality of sets of words. In some examples, a set of words of the plurality of sets of words may be associated with an emotion. Alternatively and/or additionally, a set of words of the plurality of sets of words may comprise one or more words (e.g., a word, a phrase, etc.) that are associated with an emotion.

For example, the plurality of sets of words may be analyzed based upon the transcription to identify a first set of words of the plurality of sets of words that matches the transcription. For example, the first set of words may match the transcription if the first set of words is the same as the transcription. Alternatively and/or additionally, the first set of words may match the transcription if the first set of words comprises one or more words and/or one or more characters that are the same as one or more words and/or one or more characters of the transcription. In some examples, responsive to determining that the transcription matches the first set of words of the plurality of sets of words, an emotion associated with the first user may be determined based upon an emotion associated with the first set of words.

In an example, the speech and/or the transcription may correspond to the first user saying "I'm happy". The plurality of sets of words may be analyzed based upon the transcription to determine that the transcription matches an exemplary set of words of the plurality of sets of words associated with happiness. Accordingly, it may be determined that the first user is associated with happiness within the first portion of the first video.

In another example, the speech and/or the transcription may correspond to the first user saying "Thanks a lot". The plurality of sets of words may be analyzed based upon the transcription to determine that the transcription matches an exemplary set of words of the plurality of sets of words associated with being pleased. Accordingly, it may be determined that the first user is associated with being pleased within the first portion of the first video.

In another example, the speech and/or the transcription may correspond to the first user saying "That's amazing". The plurality of sets of words may be analyzed based upon the transcription to determine that the transcription matches an exemplary set of words of the plurality of sets of words associated with excitement. Accordingly, it may be determined that the first user is associated with excitement within the first portion of the first video.

In some examples, one or more voice properties of the sound of the first user within the first portion of the first video may be analyzed to determine that the one or more voice properties are associated with the first emotion. For example, the one or more voice properties may be modulated by the first user to suggest and/or express the first emotion. The one or more voice properties may correspond to a speed at which the first user speaks, a pitch at which the first user speaks, a tone of voice of the first user and/or a power at which the first user speaks.

In some examples, a facial expression of the first user within the first portion of the first video may be analyzed to determine that the facial expression is associated with the first emotion. For example, the facial expression may correspond to one or more motions and/or one or more positions of one or more parts of a face of the first user. For example, the facial expression may correspond to a combination of one or more of a position and/or motion of one or more muscles of the face, a position of an iris and/or a pupil, a direction at which the first user is gazing, a position and/or motion of eyebrows, a position and/or motion of a mouth and/or lips, a rate at which the first user blinks, etc. In an example, the facial expression of the first user may correspond to the first user smiling and/or an emotion associated with the facial expression may correspond to happiness. In another example, the facial expression of the first user may correspond to the first user yawning and/or an emotion associated with the facial expression may correspond to boredom.

In some examples, the first portion of the first video may be analyzed to determine one or more first features of the first user within the first portion of the first video associated with the first emotion. The one or more first features may be included in the first set of features associated with the first emotion of the first user based upon the one or more first features being identified within the first portion of the first video associated with the first emotion.

In some examples, the one or more first features may comprise one or more first audio features of the first user within the first portion of the first video. For example, the one or more first audio features may comprise the speech and/or the transcription of the speech of the first user within the first video. Alternatively and/or additionally, the one or more first audio features may comprise one or more voice properties of sound of the first user within the first portion of the first video. For example, the one or more voice properties may correspond to a speed at which the first user speaks. Alternatively and/or additionally, the one or more voice properties may correspond to a pitch at which the first user speaks and/or produces sound (e.g., one or more of the first user singing, crying, moaning, laughing, etc.). Alternatively and/or additionally, the one or more voice properties may correspond to a tone of voice of the first user within the first portion of the first video. Alternatively and/or additionally, the one or more voice properties may correspond to a power at which the first user speaks and/or produces sound (e.g., a loudness with which the first user one or more of speaks, yells, screams, cries, laughs, moans, etc.). Alternatively and/or additionally, the one or more first audio features may be indicative of one or more types of sound produced by the first user within the first portion of the first video such as one or more of the first user whistling, a rate at which the first user breathes (e.g., inhales and/or exhales), an intensity of the breathing, the first user producing a sound associated with yawning, the first user crying, the first user screaming, the first user moaning, the first user laughing, etc.

In some examples, the one or more first features may comprise one or more first visual features of the first user within the first portion of the first video. For example, the one or more first visual features may be indicative of the facial expression of the first user within the first portion of the first video. Alternatively and/or additionally, the one or more first visual features may be indicative of a position of a head of the first user during the first portion of the first video (e.g., an angle at which the head is tilted, such as the head being tilted downwards, the head being tilted upwards, the head being tilted to a side, etc.). Alternatively and/or additionally, the one or more first visual features may be indicative of a position and/or movement of an upper section of the first user's body (e.g., the upper section may comprise one or more of shoulders of the first user, the head of the first user, a neck of the first user, a chest of the first user, etc.), such as one or more of a direction of movement of the upper section, a speed of movement of the upper section, etc. Alternatively and/or additionally, the one or more first visual features may be indicative of a position and/or movement of the first user's hands, such as a hand of the first user being one or more of positioned by the first user's side, positioned beside the face of the first user, etc., such as the first user scratching the face of the first user and/or moving a hand of the first user within the first portion of the first video and/or such as a hand of the first user being clenched and/or open. Alternatively and/or additionally, the one or more first visual features may be indicative of a rate at which the first user blinks in the first portion of the first video.

In some examples, the first set of features may comprise the one or more first features. Alternatively and/or additionally, the first set of features may be determined by analyzing the first portion of the first video of the one or more first videos and/or one or more portions of one or more other videos associated with the first emotion. For example, one or more second features of the first user associated with the first emotion of the first user may be determined based upon a second portion of a second video determined to be associated with the first emotion of the first user, one or more third features of the first user associated with the first emotion of the first user may be determined based upon a third portion of a third video determined to be associated with the first emotion of the first user, etc. The first set of features may comprise one or more of the one or more first features, the one or more second features, the one or more third features, etc.

It may be appreciated that the first set of features may be determined based upon images associated with the first user and/or audio associated with the first user (rather than and/or in addition to videos associated with the first user). For example, the images may comprise (representations of) the first user and/or may be captured by the first client device (and/or a different client device) and/or received from the first client device (and/or the different client device). In some examples, an image may be analyzed to determine an emotion of the first user (e.g., the emotion may be determined upon a facial expression of the first user). Alternatively and/or additionally, one or more visual features of the first user (associated with the emotion) may be determined based upon the image. The one or more visual features may be included in a set of features of the plurality of sets of features associated with the emotion.

Alternatively and/or additionally, the audio may comprise the first user producing sound and/or speaking. For example, the audio may comprise one or more of one or more phone calls associated with the first user, one or more voice calls associated with the first user, one or more voice messages associated with the first user, one or more audio recordings recorded via the first client device (and/or a different client device associated with the first user), etc. For example, the audio may be received from the first client device (and/or the different client device associated with the first user). In some examples, a portion of the audio may be analyzed to determine an emotion of the first user (e.g., the emotion may be determined based upon one or more voice properties and/or speech of the first user within the audio). Alternatively and/or additionally, one or more audio features of the first user (associated with the emotion) may be determined based upon the portion of the audio. The one or more audio features may be included in a set of features of the plurality of sets of features associated with the emotion.

Alternatively and/or additionally, using one or more of the techniques presented herein, the second set of features of the first user associated with the second emotion of the first user may be determined based upon one or more portions of one or more videos determined to be associated with the second emotion of the first user. Alternatively and/or additionally, using one or more of the techniques presented herein, a set of features of the plurality of sets of features associated with an emotion of the plurality of emotions may be determined based upon one or more portions of one or more videos determined to be associated with the emotion of the first user.

At 404, a first user emotion profile associated with the first user may be generated based upon the first set of features associated with the first emotion and/or the second set of features associated with the second emotion. Alternatively and/or additionally, the first user emotion profile associated with the first user may be generated based upon the plurality of sets of features (comprising the first set of features and/or the second set of features) associated with the plurality of emotions of the first user (comprising the first emotion and/or the second emotion).

In some examples, the first user emotion profile may be indicative of a plurality of quantities of detections of features of the plurality of sets of features. For example, a quantity of detections of the plurality of quantities of detections may be associated with a feature of the plurality of sets of features. Alternatively and/or additionally, the quantity of detections of the plurality of quantity of detections may correspond to a quantity of instances that a feature of the plurality of sets of features was detected.

In an example, the first user emotion profile may be indicative of a first exemplary quantity of detections of a first exemplary feature of the first set of features associated with the first emotion. In some examples, the first exemplary quantity of detections may correspond to a quantity of instances that the first exemplary feature is detected within one or more portions of one or more videos associated with the first emotion. Alternatively and/or additionally, the first exemplary quantity of detections may correspond to a quantity of portions of one or more videos within which the first exemplary feature is detected.

In some examples, the first user emotion profile may be indicative of a plurality of weights associated with features of the plurality of sets of features. For example, features of the plurality of sets of features may be weighted based upon the plurality of quantities of detections of features of the plurality of sets of features. In an example, a first exemplary feature of the plurality of sets of features may be associated with a first exemplary quantity of detections and/or a second exemplary feature of the plurality of sets of features may be associated with a second exemplary quantity of detections, wherein the first exemplary quantity of detections is less than the second exemplary quantity of detections. In the example, the first exemplary feature may be assigned a first exemplary weight (of the plurality of weights) and/or a second exemplary feature may be assigned a second exemplary weight (of the plurality of weights), higher than the first exemplary weight (based upon the first exemplary quantity of detections being less than the second exemplary quantity of detections).

A behavior of the first user and/or a way in which the first user expresses emotion may change over time (as the first user matures and/or progresses through life). For example, a way in which the first user expresses emotion visually and/or via sound may change over time. Accordingly, features of the plurality of sets of features may be weighted based upon a duration of time since the features were detected. In an example, a first exemplary feature of the plurality of sets of features may be determined and/or detected a first exemplary duration of time before a current time and/or a second exemplary feature of the plurality of sets of features may be determined and/or detected a second exemplary duration of time before the current time, wherein the second exemplary duration of time is less than the first exemplary duration of time (e.g., the second exemplary feature may be determined and/or detected after the first exemplary feature is determined and/or detected). In the example, the first exemplary feature may be assigned a first exemplary weight (of the plurality of weights) and/or a second exemplary feature may be assigned a second exemplary weight (of the plurality of weights), higher than the first exemplary weight (based upon the second exemplary feature being determined and/or detected after the first exemplary feature is determined and/or detected).

In some examples, the first user emotion profile may be stored within a database of user emotion profiles. The database of user emotion profiles may comprise a plurality of user emotion profiles associated with a plurality of users (and/or associated with a plurality of user accounts and/or a plurality of client devices).

At 406, a fourth video may be presented via a graphical user interface of a third client device. In some examples, the third client device may be associated with a third user. Alternatively and/or additionally, the fourth video may be displayed via a communication platform associated with the communication service.

In some examples, the fourth video may correspond to a fourth real-time video received from a fourth client device. In some examples, the fourth video may comprise a real-time representation of a view of a camera associated with the fourth client device. In some examples, the fourth client device may be the same as the first client device associated with the first user. Alternatively and/or additionally, the fourth client device may be different than the first client device associated with the first user. For example, the fourth client device may be associated with a fourth user, different than the first user, and/or the fourth client device may be associated with a fourth user account, different than the first user account.

In some examples, the fourth video may correspond to a second video communication session performed using the communication service. For example, the second video communication session may correspond to a video call and/or a video conference call between multiple users. For example, the fourth video may be recorded responsive receiving a second request to perform a video communication (e.g., a request to perform a video call and/or a video conference call). In some examples, the fourth video may be received from the fourth client device. Alternatively and/or additionally, during the second video communication session, the fourth video may be presented via the third client device. Alternatively and/or additionally, a fifth video may be received from the third client device. During the second video communication session, the fifth video may be displayed via the fourth client device.

At 408, the first user may be identified and/or detected within the fourth video. In some examples, the fourth video may comprise merely the first user. In an example where the fourth client device is the same as the first client device, the first user may be identified based upon a determination that the fourth video is recorded using the first client device (and/or the first camera) and/or a determination that the first client device (and/or the first camera) is associated with the first user. In an example where the fourth client device is different than the first client device and/or the fourth client device is associated with the first user account associated with the first user, the first user may be identified based upon a determination that the fourth client device is associated with the first user account associated with the first user (e.g., the fourth client device may be logged into the first user account associated with the first user). In an example where the fourth video corresponds to the second video communication session, the second request to perform the video communication may comprise an indication of the first user account associated with the first user.

In some examples, the fourth video (and/or one or more video frames of the fourth video) may be analyzed to identify one or more first objects within the fourth video. In some examples, the fourth video (and/or one or more video frames of the fourth video) may be analyzed using one or more object detection techniques (and/or one or more object segmentation techniques) to detect the one or more first objects. Alternatively and/or additionally, the fourth video (and/or one or more video frames of the fourth video) may be analyzed using one or more machine learning techniques to detect the object. For example, the one or more first objects may correspond to one or more people (e.g., one or more people participating in the second video communication session).

In some examples, the one or more first objects may be identified and/or detected using one or more object segmentation techniques and/or one or more image segmentation techniques. For example, a video frame of the first video may be segmented into multiple segments using the one or more object segmentation techniques and/or the one or more image segmentation techniques. The video frame may be segmented into the multiple segments based upon one or more of color differences between portions of the video frame, detected boundaries associated with the multiple segments, etc. In some examples, a segment of the multiple segments may be analyzed to determine an object, of the one or more first objects, associated with the segment. For example, an object of the one or more first objects may be detected and/or identified by comparing a segment of the multiple segments with an object dataset associated with a person to determine whether the segment corresponds to a person. In some examples, the object dataset may comprise information associated with a person, such as an appearance of a person, one or more parameters of a person, colors associated with a person, measurements associated with a person, etc.

In some examples, the one or more first objects may comprise a first object corresponding to the first user. In some examples, whether the first object corresponds to the first user may be determined by analyzing the first object to determine visual features of the first object and/or comparing the visual features of the first object with visual features of the first user emotion profile to determine a visual similarity between the first object and an appearance of the first user. In some examples, the visual features of the first object may correspond to one or more of an appearance of the first object, one or more parameters of the first object (e.g., one or more sizes of one or more body parts of the first object), one or more colors of the first object (e.g., one or more colors of one or more body parts of the first object, such as one or more of a hair color, an eye color, a skin color, etc.), one or more facial features of the first object, etc. In some examples, the visual features of the first user may correspond to one or more of one or more parameters of the first user (e.g., one or more sizes of one or more body parts of the first user), one or more colors of the first user (e.g., one or more colors of one or more body parts of the first user, such as one or more of a hair color, an eye color, a skin color, etc.), one or more facial features of the first user, etc.

In some examples, responsive to a determination that the visual similarity does not meet a visual similarity threshold, it may be determined that the first object does not correspond to the first user (and/or that the first object is not the same as the first user). Alternatively and/or additionally, responsive to a determination that the visual similarity meets the visual similarity threshold, it may be determined that the first object corresponds to the first user and/or the first user may be identified within the fourth video.

In some examples, the first user may be identified within the fourth video and/or the visual features of the first object may be compared with the visual features of the first emotion profile (associated with the first user) using one or more face recognition and/or tracking techniques (e.g., one or more techniques for person detection, recognition and/or tracking, such as multi-pose face recognition and/or tracking). In an example, one or more video frames of the fourth video may be input to a face detection algorithm. The face detection algorithm may use one or more frontal face and profile face detectors by extracting one or more 'Haar' features. The 'Haar' features may be used in a cascade of boosted classifiers. A pose may be determined using the face detection algorithm using a combination of profile and frontal face cascades. The pose may be compared with one or more faces having a similar range for classification. One or more detected faces may be projected onto an Eigenspace obtained from a training phase using modular weighted Principal Component Analysis (PCA) and/or tracked using a Kalman filter multiple face tracker. A pose range may be divided into three sections onto which faces are sorted and/or each section of the three sections may be trained separately to have an Eigenspace.

Alternatively and/or additionally, whether the first object corresponds to the first user may be determined by analyzing sound produced by the first object (e.g., the sound may correspond to speech of the first object, singing of the first object, laughing of the first object, crying of the first object, screaming of the first object, yelling of the first object, etc.) to determine audio features of the first object and/or comparing the audio features of the first object with audio features of the first user emotion profile to determine an audio similarity (e.g., a voice similarity) between the first object and a voice of the first user. In some examples, responsive to a determination that the audio similarity does not meet an audio similarity threshold, it may be determined that the first object does not correspond to the first user (and/or that the first object is not the same as the first user). Alternatively and/or additionally, responsive to a determination that the audio similarity meets the audio similarity threshold, it may be determined that the first object corresponds to the first user and/or the first user may be identified within the fourth video.

In some examples, a first location associated with the first client device (associated with the first user) may be determined. For example, the first location may correspond to a device location of the first client device and/or the first camera. For example, the first location may comprise a first set of coordinates associated with the first client device and/or the first camera. For example, the first set of coordinates may comprise a first longitude coordinate of the first client device and/or the first camera and/or a first latitude coordinate of the first client device and/or the first camera. In some examples, the first location may be determined based upon location information associated with the first client device and/or the first camera.

The location information may be received from a wireless network (e.g., a WiFi network, a hotspot, a wireless access point (WAP), a network associated with a base station, etc.) that the first client device is connected to. For example, the location information may comprise received signal strength indicators (RSSIs) associated with communications between the first client device and the wireless network. Alternatively and/or additionally, the location information may comprise angle of arrival (AoA) information. One or more RSSI localization techniques and/or one or more trilateration techniques may be performed using the RSSIs and/or the AoA information to determine the first location of the first client device.

Alternatively and/or additionally, the location information may comprise satellite navigation information comprising longitude measurements, latitude measurements and/or altitude measurements associated with locations of the first client device. The satellite navigation information may be received from a satellite navigation system, such as a global navigation satellite system (GNSS) (e.g., Global Positioning System (GPS), Global Navigation Satellite System (GLONASS), Galileo, etc.). In some examples, the first location of the first client device (and/or the first user) may be determined based upon merely the satellite navigation information. Alternatively and/or additionally, the device location may be determined based upon a combination of the satellite navigation information, the AoA information and/or the RSSIs.

Alternatively and/or additionally, the first location may be determined based upon one or more images and/or one or more videos captured and/or recorded by the first client device (and/or received from the first client device). For example, the one or more images and/or the one or more videos may be analyzed using one or more image recognition techniques and/or one or more object recognition techniques to identify one or more landmarks within the one or more images and/or the one or more videos (e.g., the one or more images and/or the one or more videos may be compared with a landmark information database to identify the one or more landmarks within the one or more images and/or the one or more videos). The one or more landmarks may correspond to one or more of one or more structures, one or more buildings, one or more natural locations, etc. One or more locations of the one or more landmarks may be determined. The first location may be determined based upon the one or more locations.

In some examples, a second location associated with the fourth client device may be determined. For example, the second location may correspond to a device location of the fourth client device. For example, the second location may comprise a second set of coordinates associated with the fourth client device. For example, the second set of coordinates may comprise a second longitude coordinate of the fourth client device and/or a second latitude coordinate of the fourth client device. In some examples, the second location may be determined based upon second location information associated with the fourth client device. Alternatively and/or additionally, one or more images and/or one or more videos, such as the fourth video, captured and/or recorded by the fourth client device may be analyzed using one or more image recognition techniques to identify one or more second landmarks within the one or more images and/or the one or more videos. One or more locations of the one or more second landmarks may be determined. The second location may be determined based upon the one or more locations of the one or more second landmarks.

In some examples, a distance between the first location (associated with the first client device) and the second location (associated with the fourth client device) may be determined. For example, the first location may be compared with the second location to determine the distance. In some examples, responsive to a determination that the distance is greater than a threshold distance, it may be determined that the first object is not the same as the first user. Alternatively and/or additionally, responsive to a determination that the distance is greater than the threshold distance, the visual features of the first object and/or the audio features of the first object may not be compared with the visual features of the first user emotion profile and/or the audio features of the first user emotion profile to determine whether the first object corresponds to the first user. Alternatively and/or additionally, responsive to a determination that the distance is less than the threshold distance, it may be determined that the first user is the same as the first object and/or the first object may be identified within the second image. Alternatively and/or additionally, responsive to a determination that the distance is less than the threshold distance, the visual features of the first object and/or the audio features of the first object may be compared with the visual features of the first user emotion profile and/or the audio features of the first user emotion profile to determine whether the first object corresponds to the first user.

At 410, it may be determined that the first user is associated with the first emotion based upon the fourth video and/or the first user emotion profile. In some examples, the first user emotion profile may be analyzed based upon a fourth portion of the fourth video to determine that one or more fourth features of the first user within the fourth portion of the fourth video are associated with the first set of features associated with the first emotion of the first user.

In some examples, the fourth portion of the fourth video may be analyzed to determine the one or more fourth features of the first user within the fourth portion of the fourth video. In some examples, the one or more fourth features may comprise one or more fourth audio features of the first user within the fourth portion of the fourth video. Alternatively and/or additionally, the one or more fourth features may comprise one or more fourth visual features of the first user within the fourth portion of the fourth video.

In some examples, the one or more fourth audio features may comprise speech of the first user within the fourth portion of the fourth video and/or a transcription of the speech of the first user within the fourth portion of the fourth video. Alternatively and/or additionally, the one or more fourth audio features may comprise one or more voice properties of sound produced by the first user within the fourth portion of the fourth video. For example, the one or more voice properties may correspond to a speed at which the first user speaks within the fourth portion of the fourth video. Alternatively and/or additionally, the one or more voice properties may correspond to a pitch at which the first user speaks and/or produces sound (e.g., one or more of the first user singing, crying, moaning, laughing, etc.) within the fourth portion of the fourth video. Alternatively and/or additionally, the one or more voice properties may correspond to a tone of voice of the first user within the fourth portion of the fourth video. Alternatively and/or additionally, the one or more voice properties may correspond to a power at which the first user speaks and/or produces sound (e.g., a loudness with which the first user one or more of speaks, yells, screams, cries, laughs, moans, etc.) within the fourth portion of the fourth video. Alternatively and/or additionally, the one or more fourth audio features may be indicative of one or more types of sound produced by the first user within the fourth portion of the fourth video, such as one or more of the first user whistling, a rate at which the first user breathes (e.g., inhales and/or exhales), an intensity of the breathing, the first user producing a sound associated with yawning, the first user crying, the first user screaming, the first user moaning, the first user laughing, etc.

In some examples, the one or more fourth visual features of the first user within the fourth portion of the fourth video may be indicative of a facial expression of the first user within the fourth portion of the fourth video. Alternatively and/or additionally, the one or more fourth visual features may be indicative of a position of the head of the first user during the fourth portion of the fourth video (e.g., an angle at which the head is tilted, such as the head being tilted downwards, the head being tilted upwards, the head being tilted to a side, etc.). Alternatively and/or additionally, the one or more fourth visual features may be indicative of a position and/or movement of the upper section of the first user's body, such as one or more of a direction of movement of the upper section, a speed of movement of the upper section, etc. Alternatively and/or additionally, the one or more fourth visual features may be indicative of a position and/or movement of the first user's hands, such as a hand of the first user being one or more of positioned by the first user's side, positioned beside the face of the first user, etc., such as the first user scratching the face of the first user and/or moving a hand of the first user within the fourth portion of the fourth video and/or such as a hand of the first user being clenched and/or open. Alternatively and/or additionally, the one or more fourth visual features may be indicative of a rate at which the first user blinks in the fourth portion of the fourth video.

In some examples, the one or more fourth features may be compared with the plurality of sets of features of the first user emotion profile to determine a set of features of the plurality of sets of features associated with the one or more fourth features. Alternatively and/or additionally, the one or more fourth features may be compared with the plurality of sets of features of the first user emotion profile to determine a set of features of the plurality of sets of features that matches the one or more fourth features. For example, the one or more fourth features may match the first set of features associated with the first emotion responsive to a determination that the one or more features of the one or more fourth features matches (and/or are the same as) one or more features of the first set of features associated with the first emotion.

In some examples, the one or more fourth visual features may be compared with the first set of visual features to determine whether the one or more fourth visual features match the first set of visual features. In some examples, the one or more fourth visual features may be compared with the first set of visual features using one or more deep learning (e.g., deep metric learning) techniques.

In an example, the one or more fourth visual features may comprise a first multi-dimensional vector (e.g., a 128 dimension vector) corresponding to the face of the first user (associated with the facial expression of the first user within the fourth portion of the fourth video). For example, the first multi-dimensional vector may be generated based upon one or more video frames of the fourth video comprising the face of the first user (e.g., the face of the first user within the one or more video frames may be quantified to generate the first multi-dimensional vector). Alternatively and/or additionally, the first set of visual features may comprise a second multi-dimensional vector corresponding to the face of the first user (associated with a facial expression of the first user when the first user is associated with the first emotion). The first multi-dimensional vector of the one or more fourth visual features may be compared with the second multi-dimensional vector of the first set of visual features to determine whether the first user is associated with the first emotion during the fourth portion of the fourth video.

Alternatively and/or additionally, the one or more fourth audio features may be compared with the first set of audio features to determine whether the one or more fourth audio features match the first set of audio features. In some examples, the one or more fourth audio features may be compared with the first set of audio features using one or more transfer learning techniques.

In an example, the one or more fourth audio features may comprise a first set of spectrograms (e.g., a set of one or more spectrograms). For example, the first set of spectrograms may be generated based upon sound produced by the first user within the fourth portion of the fourth video (e.g., the sound produced by the first user within the fourth portion of the fourth video may be converted to spectrogram form to generate the first set of spectrograms). In some examples, a convolutional neural network (CNN) may be trained using audio data (e.g., audio and/or spectrograms) to output one or more features for input to a support-vector machine (SVM). In some examples, the first set of audio features may comprise a second set of spectrograms (e.g., a set of one or more spectrograms). For example, the second set of spectrograms may be generated based upon sound produced by the first user when the first user is associated with the first emotion. The first set of spectrograms and/or the second set of spectrograms may be analyzed using the CNN and/or the SVM to determine whether the first user is associated with the first emotion during the fourth portion of the fourth video.

Alternatively and/or additionally, the one or more fourth features may be compared with the plurality of sets of features of the first user emotion profile to determine a plurality of similarities between the one or more fourth features and the plurality of sets of features. In some examples, a similarity of the plurality of similarities may correspond to a similarity between the one or more fourth features and a set of features of the plurality of sets of features. In some examples, it may be determined that the one or more fourth features are associated with the first set of features and/or that the first user is associated with the first emotion within the fourth portion of the fourth video responsive to a determination that a first similarity between the one or more fourth features and the first set of features associated with the first emotion is higher than other similarities of the plurality of similarities (and/or that the first similarity is a highest similarity of the plurality of similarities).

In some examples, the one or more fourth features may be compared with the plurality of sets of features based upon the plurality of weights associated with features of the plurality of sets of features. In an example, a first exemplary weight associated with a first exemplary feature of the plurality of sets of features may be higher than a second exemplary weight associated with a second exemplary feature of the plurality of sets of features. In the example, the first exemplary feature may have more influence than the second exemplary feature in comparing the one or more fourth features with the plurality of sets of features and/or determining that the first user is associated with the first emotion within the fourth portion of the fourth video based upon the second exemplary weight being higher than the first exemplary weight.

In some examples, the one or more fourth features may be compared with the plurality of sets of features and/or an emotion associated with the first user within the fourth portion of the fourth video may be determined based upon a time associated with the first user and/or the fourth portion of the fourth video. In some examples, the time may correspond to a time of day of the fourth portion of the fourth video with respect to the second location of the fourth client device. For example, a time zone associated with the second location may be determined and/or the time may be determined based upon the time zone. In an example, it may be determined that the time corresponds to late at night and/or early in the morning, when the first user may be exhausted. In the example, one or more features of the first user within the fourth portion of the fourth video that may be contributed by exhaustion of the first user (e.g., one or more of the first user speaking and/or moving slowly, yawning by the first user, the first user's eyes not being fully open, etc.), may not be included in the one or more fourth features and/or may be removed from the one or more fourth features (and/or may not be compared with the plurality of sets of features). Accordingly, the one or more features of the first user that may be contributed by exhaustion of the first user may not be used in determining an emotion associated with the first user within the fourth portion of the fourth video to avoid an incorrect determination that the first user is associated with an emotion (e.g., boredom) associated with a set of features similar to the one or more features.

At 412, a representation of the first emotion may be displayed via the graphical user interface of the third client device (presenting the fourth video). For example, the representation of the first emotion may be displayed via the graphical user interface of the third client device responsive to determining that the first user is associated with the first emotion. In some examples, the representation of the first emotion may be overlaid onto the fourth video. For example, the representation of the first emotion may be overlaid onto the fourth video using one or more augmented reality (AR) techniques. Alternatively and/or additionally, the representation of the first emotion may be displayed adjacent to the fourth video.

In some examples, the representation of the first emotion may correspond to a first graphical object representative of the first emotion. For example, the first graphical object may comprise a rectangle, a rounded rectangle, a text bubble, a sphere, an oval and/or a different shape. In some examples, the first graphical object may comprise text indicative of the first emotion. In an example where the first emotion corresponds to "happiness", the first graphical object may comprise "Happy". In an example where the first emotion corresponds to boredom, the first graphical object may comprise "Bored".

Alternatively and/or additionally, the first graphical object may be a color and/or a shade indicative of the first emotion. In an example, the first graphical object may be a first color (e.g., blue) if the first emotion corresponds to a positive emotion, sentiment, opinion, feeling, thought and/or judgment of the first user towards (and/or about) one or more of the third user associated with the third client device (and/or a different user associated with the second video communication session), an opinion expressed by the third user (and/or the different user), a statement made by the third user (and/or the different user), one or more events explained by the third user (and/or the different user), etc. Alternatively and/or additionally, the first graphical object may be a second color (e.g., red) if the first emotion corresponds to a negative emotion, sentiment, opinion, feeling, thought and/or judgment of the first user towards (and/or about) one or more of the third user associated with the third client device (and/or the different user), an opinion expressed by the third user (and/or the different user), a statement made by the third user (and/or the different user), one or more events explained by the third user (and/or the different user), etc.

In another example, the first graphical object may be a first shade of the first color (e.g., light blue) if the first emotion corresponds to the first level of positivity, the first graphical object may be a second shade of the first color (e.g., dark blue) if the first emotion corresponds to the second level of positivity, the first graphical object may be a first shade of the second color (e.g., light red) if the first emotion corresponds to the first level of negativity and/or the first graphical object may be a second shade of the second color (e.g., dark red) if the first emotion corresponds to the second level of negativity.

In some examples, the first graphical object may be indicative of an action and/or a statement determined to have caused the first user to be associated with the first emotion. For example, the fourth video may be analyzed to identify a time of the fourth video that the first user changes from being associated with an exemplary emotion, different than the first emotion, to the first user being associated with the first emotion. In some examples, a portion of the fifth video prior to the time may be analyzed to identify the action and/or the statement within the portion of the fifth video. Alternatively and/or additionally, the portion of the fifth video may be analyzed to determine one or more features (e.g., one or more visual features and/or one or more audio features) of the third user within the portion of the fifth video. The action and/or the statement may be determined based upon the one or more features. Alternatively and/or additionally, the first graphical object may display a suggestion (for the third user) based upon the action and/or the statement and/or based upon the first emotion.

In an example, the portion of the fifth video may be analyzed to determine that the first user changed from being associated with the exemplary emotion to the first emotion following the third user making a statement (e.g., a joke, an uplifting statement, news that the first user likes, etc.). For example, the first emotion may correspond to enthusiasm, enjoyment, happiness and/or a positive emotion, sentiment, opinion, feeling, thought and/or judgment of the first user towards the third user and/or the statement of the third user. In some examples, the first graphical object may be representative of the first emotion and/or the statement (e.g., the first graphical object may comprise "Jill enjoys your joke").

In another example, the portion of the fifth video may be analyzed to determine that the first user changed from being associated with the exemplary emotion to the first emotion following the third user making a statement (e.g., a statement that may be offensive to the first user and/or may upset the first user). For example, the first emotion may correspond to frustration, disappointment, anger, nervousness and/or a negative emotion, sentiment, opinion, feeling, thought and/or judgment of the first user towards the third user and/or the statement by the third user. A transcription of the statement may be generated. In some examples, the first graphical object may be representative of the first emotion and/or the statement (e.g., the first graphical object may comprise "Jill is angered by you saying 'I don't think that matters'").

In another example, the portion of the fifth video may be analyzed to determine that the first user changed from being associated with the exemplary emotion to the first emotion following the third user speaking (e.g., the third user may speak in such a way that the first user cannot understand). For example, the first emotion may correspond to confusion, frustration and/or a negative emotion, sentiment, opinion, feeling, thought and/or judgment of the first user towards the third user. The portion of the fifth video may be analyzed to determine that the third user speaks quickly during the fifth video. In some examples, the first graphical object may be representative of the first emotion and/or a suggestion determined based upon the first emotion and/or the determination that the third user speaks quickly (e.g., the first graphical object may comprise "Jill can't understand you well because you are speaking too fast. If you speak more slowly/clearly and/or enunciate, she may understand you better").

In some examples, the first graphical object may be displayed overlaying a portion of the fourth video that is adjacent to the first user and/or within a proximity of the first user and/or the face of the first user (e.g., the first graphical object may be displayed above the face of the first user, below the face of the first user and/or to the side of the face of the first user). In some examples, responsive to movement of the first user and/or movement of the face of the first user within the fourth video, the first graphical object may move in association with the movement of the first user and/or the movement of the face of the first user. For example, the movement of the first user and/or the movement of the face of the first user may be tracked and/or monitored using one or more face tracking techniques. The first graphical object may be moved and/or changed such that the first graphical object remains adjacent to the first user and/or the face of the first user and/or such that the first graphical object remains within the proximity of the first user and/or the face of the first user.

In some examples, the movement of the face of the first user may be tracked and/or monitored using one or more machine learning techniques, such as by using a CNN and/or an algorithm corresponding to multi-task cascaded CNNs. In an example, a set of face landmark points associated with the face of the first user may be determined using the CNN. For example, the set of face landmark points may comprise five face landmark points corresponding to one or more of eyes of the first user, a nose of the first user, corners of a mouth of the first user, etc. In some examples, the movement of the face of the first user may be tracked and/or monitored by tracking and/or monitoring movement of the five face landmark points within the fourth video.

In some examples, the first graphical object may comprise user identification information associated with the first user, such as one or more of a name of the first user, a job title of the first user, a hobby of the first user, etc. For example, the user identification information may be determined based upon a first user profile associated with the first client device and/or the first user account. Alternatively and/or additionally, the user identification information may be input via a communication interface associated with the communication service.

In some examples, the fourth video may be periodically analyzed to determine whether an emotion associated with the first user changes. For example, after a duration of time following a determination that the first user is associated with the first emotion, a fifth portion of the fourth video (following the fourth portion of the fourth video) may be analyzed to determine one or more fifth features of the first user within the fifth portion of the fourth video. In some examples, the first user emotion profile associated with the first user may be analyzed based upon the one or more fifth features to determine an emotion associated with the first user and/or to determine whether an emotion associated with the first user changed. In some examples, responsive to determining that an emotion associated with the first user changes, the first graphical object may be modified. For example, responsive to determining that the first user is associated with a third emotion, the first graphical object may be modified to represent the second emotion, rather than the first emotion. For example, a color, a shade of color and/or text of the first graphical object may be modified to represent the second emotion.

In some examples, the fifth video associated with the second video communication session (received from the third client device) may be analyzed to identify one or more users (comprising the third user associated with the third client device) within the fifth video. In some examples, one or more emotions associated with the one or more users may be determined using one or more of the techniques presented herein. Alternatively and/or additionally, one or more representations of the one or more emotions may be displayed via the fourth client device. For example, the one or more representations of the one or more emotions may be overlaid onto the fifth video (displayed via the fourth client device).

In some examples, prior to analyzing the fourth video to determine that the first user is associated with the first emotion and/or prior to displaying the representation of the first emotion, a message may be received from the fourth client device. In some examples, the message may correspond to determining one or more emotions associated with one or more users within the fourth video and/or displaying one or more representations of the one or more emotions via the graphical user interface of the third client device. In some examples, the message may be received from the fourth client device via the communication interface associated with the communication service. In some examples, a selectable input associated with the message may be displayed via the communication interface responsive to receiving the second request to perform a video communication. For example, the selectable input may be associated with providing authorization and/or consent to determine the one or more emotions associated with the one or more users within the fourth video and/or to display the one or more representations of the one or more emotions via the graphical user interface of the third client device. In some examples, the message may be received responsive to a selection of the selectable input. Alternatively and/or additionally, responsive to receiving the message, the fourth video may be analyzed to determine the one or more emotions (comprising the first emotion) associated with the one or more users (comprising the first user) and/or the one or more representations of the one or more emotions (comprising the representation of the first emotion) may be displayed via the graphical user interface of the third client device.

In some examples, it may be determined that a user emotion profile associated with an exemplary user of the one or more users within the fourth video is not available (e.g., a user emotion profile associated with the exemplary user may not have been generated). In some examples, responsive to determining that a user emotion profile associated with the exemplary user is not available, an emotion of the exemplary user may be determined based upon one or more user emotion profiles associated with one or more users, different than the exemplary user. One or more features (e.g., one or more visual features and/or one or more audio features) associated with the exemplary user may be determined by analyzing a portion of the fourth video. The one or more user emotion profiles may be analyzed based upon the one or more features to determine an emotion associated with the exemplary user. A representation of the emotion may be displayed via the graphical user interface of the third client device (e.g., the representation of the emotion may be overlaid onto the fourth video and/or adjacent to the exemplary user within the fourth video).

In some examples, the one or more user emotion profiles may be selected based upon a determination that the one or more user emotion profiles are associated with one or more users associated with a culture similar to the exemplary user.

Alternatively and/or additionally, the one or more user emotion profiles may be selected based upon demographic information associated with the exemplary user, such as a location associated with the exemplary user, an age associated with the exemplary user, a gender associated with the exemplary user and/or one or more interests of the exemplary user. In some examples, the location associated with the exemplary user may correspond to a region in which the exemplary user lives. The location may be determined based upon a user profile associated with the exemplary user and/or based upon the second location of the fourth client device. Alternatively and/or additionally, the age associated with the exemplary user may be determined based upon the user profile associated with the exemplary user and/or by analyzing the fourth video using one or more image analysis techniques to determine the age of the exemplary user. Alternatively and/or additionally, the gender associated with the exemplary user may be determined based upon the user profile associated with the exemplary user and/or by analyzing the fourth video using one or more image analysis techniques to determine the gender of the exemplary user. In some examples, the one or more user emotion profiles may be selected based upon a determination that the one or more user emotion profiles (and/or the one or more users associated with the one or more user emotion profiles) are associated with the location, the age and/or the gender of the user demographic information.

Alternatively and/or additionally, it may be determined that information and/or features comprised within an exemplary user emotion profile associated with the exemplary user are insufficient to determine an emotion associated with the exemplary user (based upon one or more features associated with the exemplary user determined by analyzing the portion of the fourth video). In some examples, responsive to determining that information and/or features comprised within the exemplary user emotion profile associated with the exemplary user are insufficient to determine an emotion associated with the exemplary user, an emotion associated with the exemplary user may be determined based upon the exemplary user emotion profile and/or the one or more user emotion profiles associated with the one or more users different than the exemplary user (and/or information and/or features of the one or more user emotion profiles may be added to the exemplary user emotion profile). The exemplary user emotion profile associated with the exemplary user and/or the one or more user emotion profiles may be analyzed based upon the one or more features associated with the exemplary user to determine an emotion associated with the exemplary user.

It may be appreciated that one or more of the techniques presented herein may be applied for determining emotions of users based upon audio. For example, emotions of users performing voice communication sessions (e.g., one or more of phone calls, voice calls, etc.) may be determined using one or more of the techniques presented herein. In an example, the first client device associated with the first user and/or a fifth client device associated with a fifth user may be used to perform a voice communication session. The first user and/or the fifth user may converse via the voice communication session. One or more audio features of the first user may be determined by analyzing audio of the voice communication session. The one or more audio features may be compared with audio features of the plurality of sets of features to determine an emotion associated with the first user. A representation of the emotion associated with the first user may be displayed via the fifth client device associated with the fifth user.

FIGS. 5A-5I illustrate a system 501 for determining an emotion of a user and/or presenting a representation of the emotion. A first user 544, such as user John, (and/or a first client device 564 associated with the first user 544) may access and/or interact with a communication service, such as a browser, software, a website, an application, an operating system, etc. that provides a communication platform for communicating with one or more users via one or more of video calls, video conference calls, voice calls, voice conference calls, instant messaging, etc.

In some examples, videos associated with the first user 544 may be analyzed to determine a plurality of sets of features associated with a plurality of emotions of the first user 544. In some examples, the videos may correspond to real-time videos recorded by the first client device 564 for performing video communication sessions. A set of features of the plurality of sets of features may be associated with an emotion of the plurality of emotions of the first user 544. Alternatively and/or additionally, a set of features of the plurality of sets of features may comprise a set of visual features of the first user 544 and/or a set of audio features of the first user 544. In some examples, a first user emotion profile associated with the first user 544 may be generated based upon and/or may comprise the plurality of sets of features associated with the plurality of emotions.

Figure 5A:
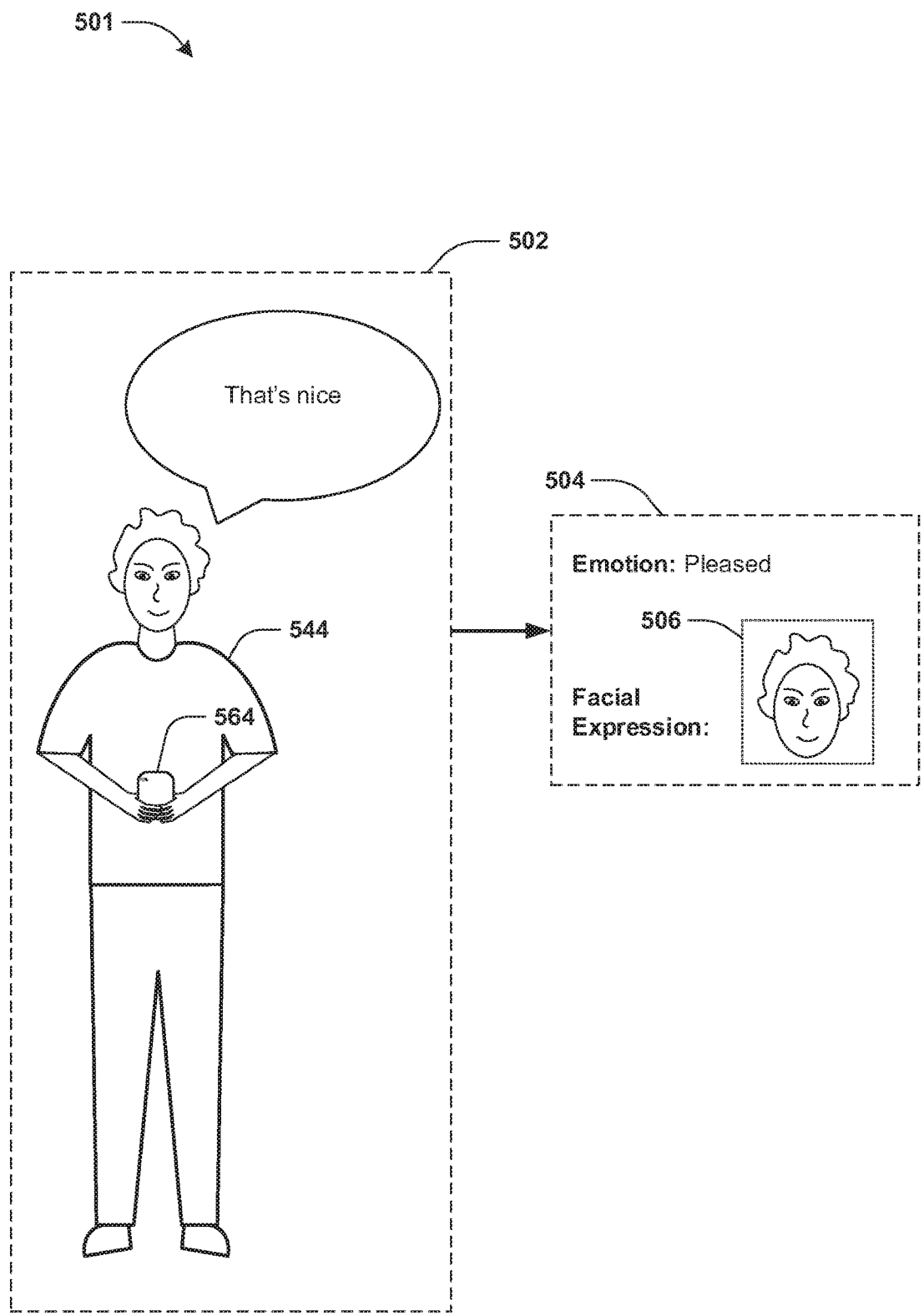
FIG. 5A is a diagram illustrating an exemplary system for determining an emotion of a user and/or presenting a representation of the emotion, where a first portion of a first video associated with a first user is analyzed to determine one or more first features associated with a first emotion.

FIG. 5A illustrates a first portion of a first video associated with the first user 544 being analyzed to determine one or more first features 504 associated with a first emotion. In some examples, the first client device 564 may record the first video for performing a first video communication session using the communication service (e.g., the first user 544 may converse with one or more users via the first video communication session). In some examples, during a first period of time 502 corresponding to the first portion of the first video, the first user 544 may be associated with the first emotion (e.g., pleased). For example, it may be determined that the first user 544 is associated with the first emotion within the first portion of the first video based upon one or more of a first facial expression 506 associated with the first user 544 within the first portion of the first video, speech of the first user 544 within the first portion of the first video (e.g., the first user 544 may say "That's nice", which may be associated with the first emotion), one or more voice properties of the first user 544 within the first portion of the first video, etc. In some examples, the first portion of the first video may be analyzed to determine the one or more first features 504 of the first user 544 within the first portion of the first video associated with the first emotion. The one or more first features 504 may comprise one or more first audio features of the first user 544 (e.g., one or more of the speech, a transcription of the speech, one or more voice properties of sound of the first user 544 within the first portion of the first video, etc.) and/or one or more first visual features of the first user 544 (e.g., one or more of the first facial expression 506 of the first user 544 within the first portion of the first video, a position of a head of the first user 544, one or more movements of one or more body parts of the first user 544, etc.). In some examples, a first set of features, of the plurality of sets of features, associated with the first emotion may be generated (and/or updated) based upon the one or more first features 504.

Figure 5B:
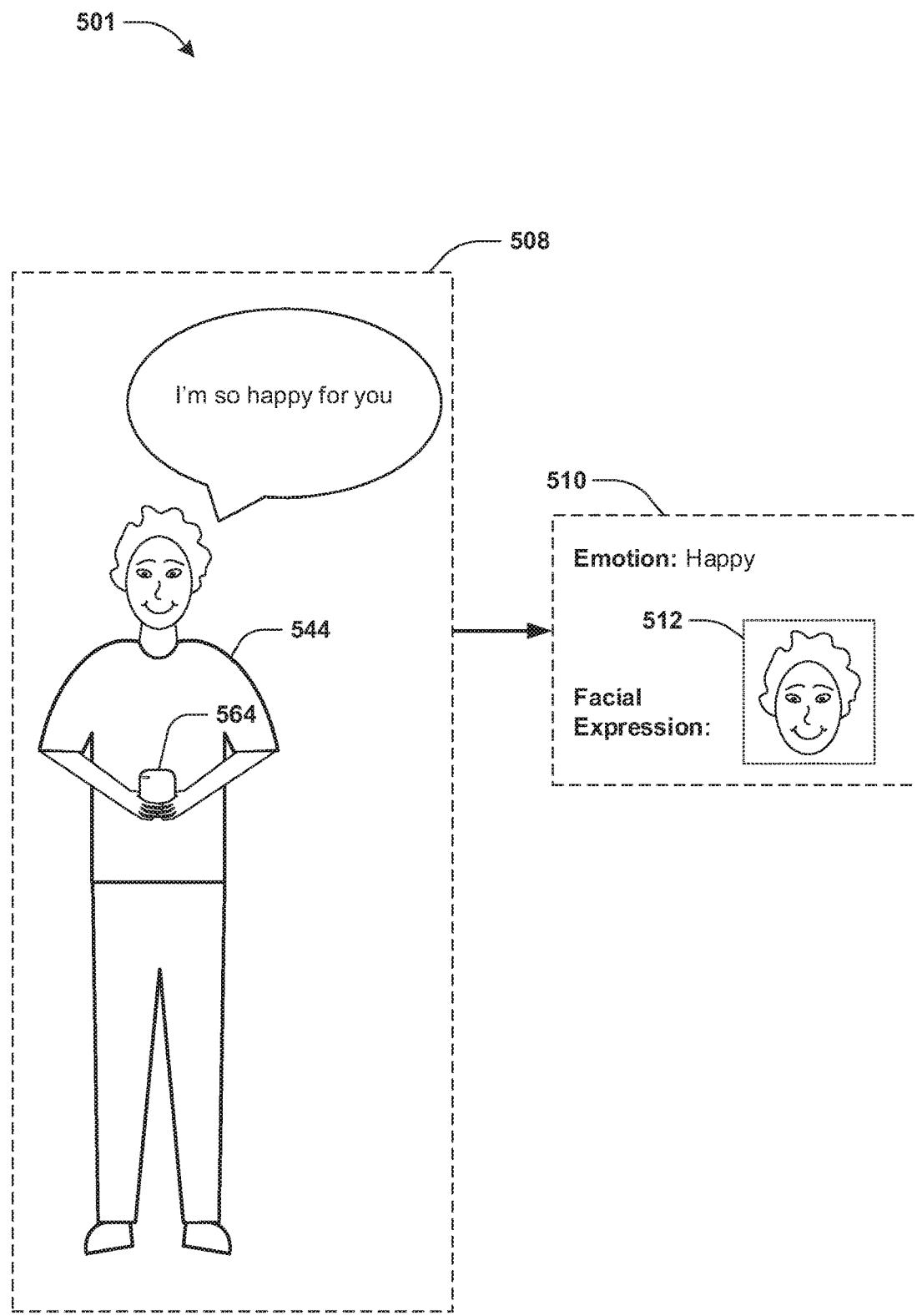
FIG. 5B is a diagram illustrating an exemplary system for determining an emotion of a user and/or presenting a representation of the emotion, where a second portion of a second video associated with a first user is analyzed to determine one or more second features associated with a second emotion.

FIG. 5B illustrates a second portion of a second video associated with the first user 544 being analyzed to determine one or more second features 510 associated with a second emotion. In some examples, the first client device 564 may record the second video for performing a second video communication session using the communication service (e.g., the first user 544 may converse with one or more users via the second video communication session). In some examples, during a second period of time 508 corresponding to the second portion of the second video, the first user 544 may be associated with the second emotion (e.g., happy). For example, it may be determined that the first user 544 is associated with the second emotion within the second portion of the second video based upon one or more of a second facial expression 512 associated with the first user 544 within the second portion of the second video, speech of the first user 544 within the second portion of the second video (e.g., the first user 544 may say "I'm so happy for you", which may be associated with the second emotion), one or more voice properties of the first user 544 within the second portion of the second video, etc. In some examples, the second portion of the second video may be analyzed to determine the one or more second features 510 of the first user 544 within the second portion of the second video associated with the second emotion. The one or more second features 510 may comprise one or more second audio features of the first user 544 (e.g., one or more of the speech, a transcription of the speech, one or more voice properties of sound of the first user 544 within the second portion of the second video, etc.) and/or one or more second visual features of the first user 544 (e.g., one or more of the second facial expression 512 of the first user 544 within the second portion of the second video, a position of a head of the first user 544, one or more movements of one or more body parts of the first user 544, etc.). In some examples, a second set of features, of the plurality of sets of features, associated with the second emotion may be generated (and/or updated) based upon the one or more second features 510.

Figure 5C:
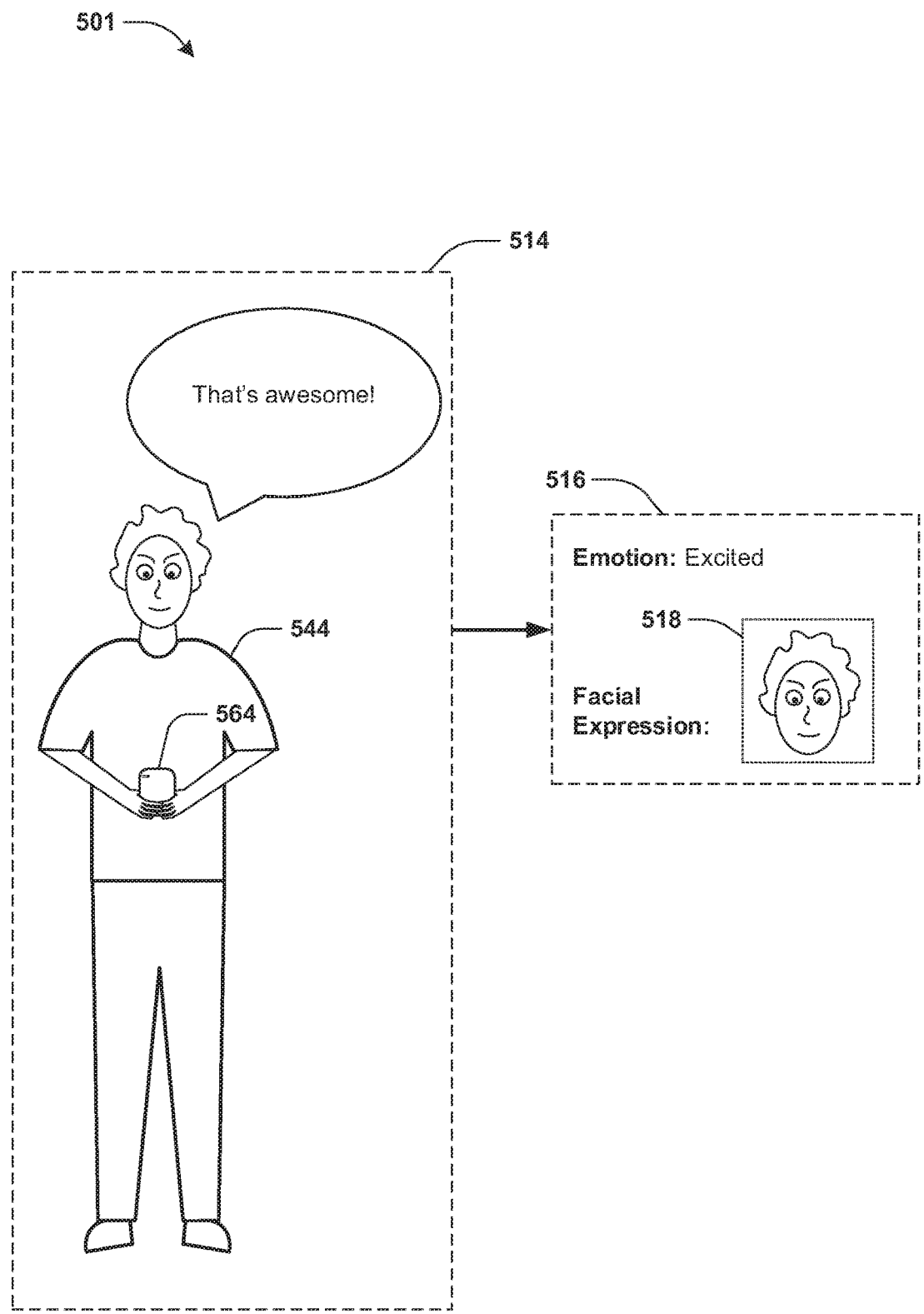
FIG. 5C is a diagram illustrating an exemplary system for determining an emotion of a user and/or presenting a representation of the emotion, where a third portion of a third video associated with a first user is analyzed to determine one or more third features associated with a third emotion.

FIG. 5C illustrates a third portion of a third video associated with the first user 544 being analyzed to determine one or more third features 516 associated with a third emotion. In some examples, the first client device 564 may record the third video for performing a third video communication session using the communication service (e.g., the first user 544 may converse with one or more users via the third video communication session). In some examples, during a third period of time 514 corresponding to the third portion of the third video, the first user 544 may be associated with the third emotion (e.g., excited). For example, it may be determined that the first user 544 is associated with the third emotion within the third portion of the third video based upon one or more of a third facial expression 518 associated with the first user 544 within the third portion of the third video, speech of the first user 544 within the third portion of the third video (e.g., the first user 544 may say "That's awesome", which may be associated with the third emotion), one or more voice properties of the first user 544 within the third portion of the third video (e.g., the first user 544 may speak loudly and/or in an excited manner), etc. In some examples, the third portion of the third video may be analyzed to determine the one or more third features 516 of the first user 544 within the third portion of the third video associated with the third emotion. The one or more third features 516 may comprise one or more third audio features of the first user 544 (e.g., one or more of the speech, a transcription of the speech, one or more voice properties of sound of the first user 544 within the third portion of the third video, etc.) and/or one or more third visual features of the first user 544 (e.g., one or more of the third facial expression 518 of the first user 544 within the third portion of the third video, a position of a head of the first user 544, one or more movements of one or more body parts of the first user 544, etc.). In some examples, a third set of features, of the plurality of sets of features, associated with the third emotion may be generated (and/or updated) based upon the one or more third features 516.

Figure 5D:
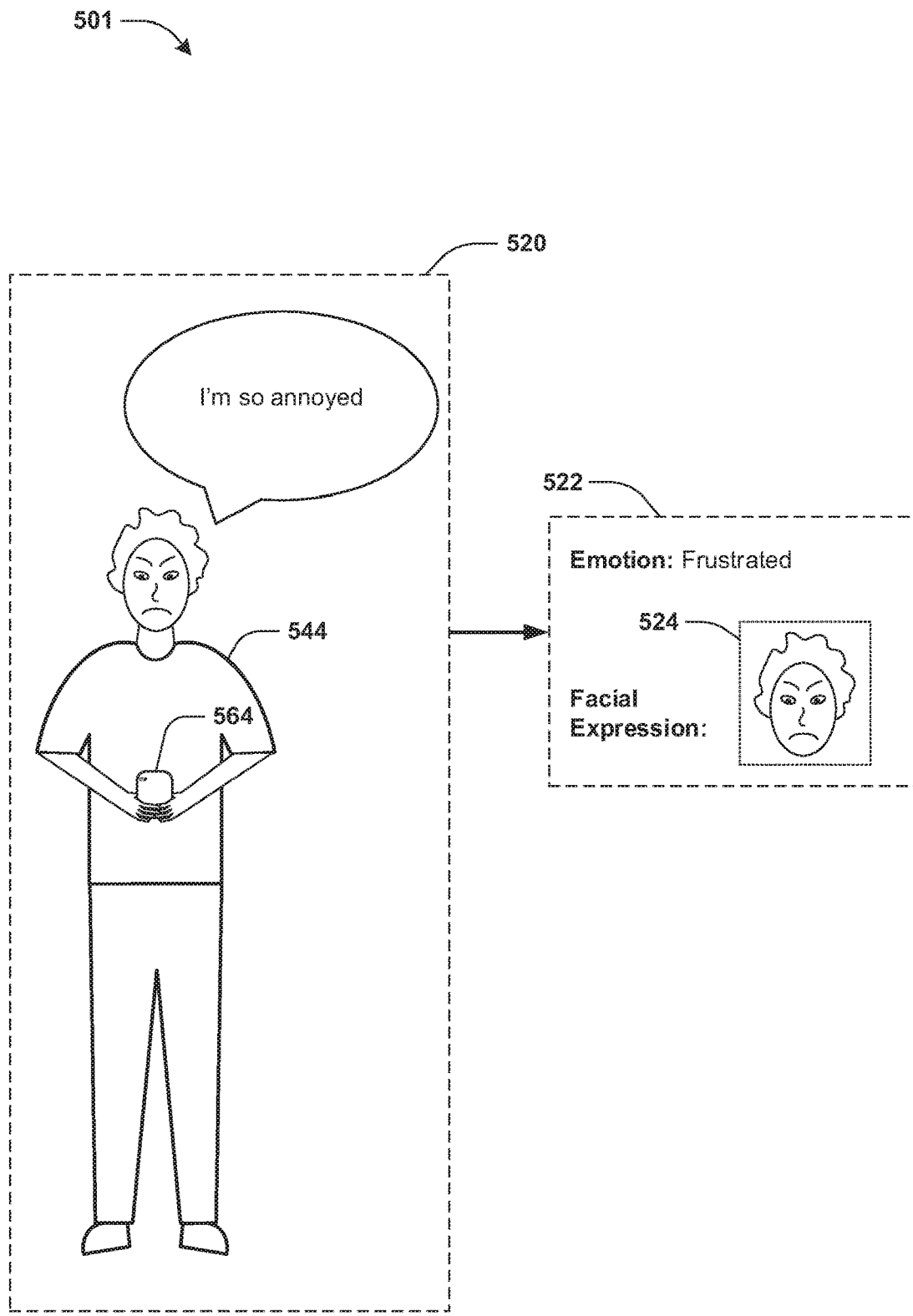
FIG. 5D is a diagram illustrating an exemplary system for determining an emotion of a user and/or presenting a representation of the emotion, where a fourth portion of a fourth video associated with a first user is analyzed to determine one or more fourth features associated with a fourth emotion.

FIG. 5D illustrates a fourth portion of a fourth video associated with the first user 544 being analyzed to determine one or more fourth features 522 associated with a fourth emotion. In some examples, the first client device 564 may record the fourth video for performing a fourth video communication session using the communication service (e.g., the first user 544 may converse with one or more users via the fourth video communication session). In some examples, during a fourth period of time 520 corresponding to the fourth portion of the fourth video, the first user 544 may be associated with the fourth emotion (e.g., frustrated). For example, it may be determined that the first user 544 is associated with the fourth emotion within the fourth portion of the fourth video based upon one or more of a fourth facial expression 524 associated with the first user 544 within the fourth portion of the fourth video, speech of the first user 544 within the fourth portion of the fourth video (e.g., the first user 544 may say "I'm so annoyed", which may be associated with the fourth emotion), one or more voice properties of the first user 544 within the fourth portion of the fourth video, etc. In some examples, the fourth portion of the fourth video may be analyzed to determine the one or more fourth features 522 of the first user 544 within the fourth portion of the fourth video associated with the fourth emotion. The one or more fourth features 522 may comprise one or more fourth audio features of the first user 544 (e.g., one or more of the speech, a transcription of the speech, one or more voice properties of sound of the first user 544 within the fourth portion of the fourth video, etc.) and/or one or more fourth visual features of the first user 544 (e.g., one or more of the fourth facial expression 524 of the first user 544 within the fourth portion of the fourth video, a position of a head of the first user 544, one or more movements of one or more body parts of the first user 544, etc.). In some examples, a fourth set of features, of the plurality of sets of features, associated with the fourth emotion may be generated (and/or updated) based upon the one or more fourth features 522.

Figure 5E:
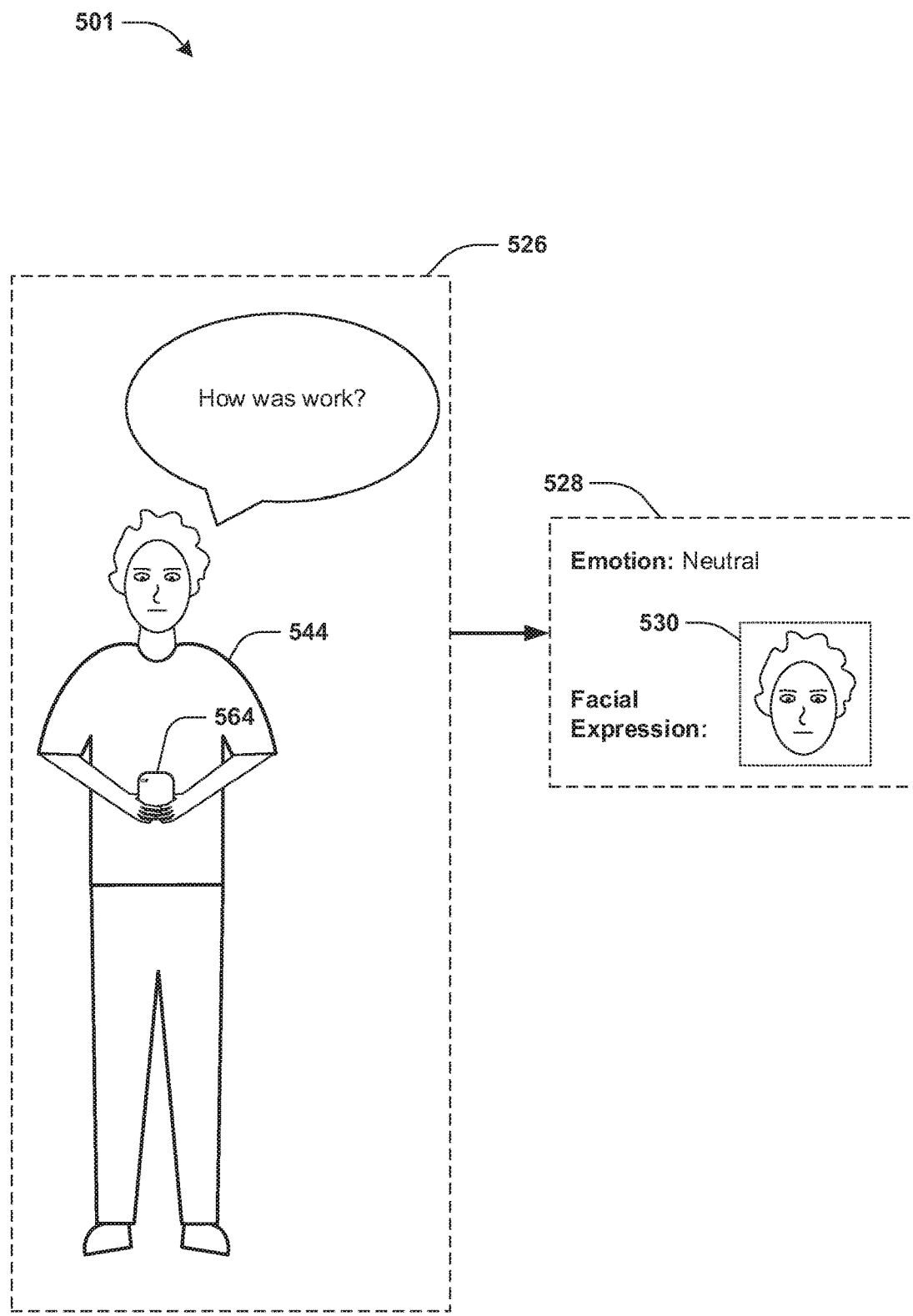
FIG. 5E is a diagram illustrating an exemplary system for determining an emotion of a user and/or presenting a representation of the emotion, where a fifth portion of a fifth video associated with a first user is analyzed to determine one or more fifth features associated with a fifth emotion.

FIG. 5E illustrates a fifth portion of a fifth video associated with the first user 544 being analyzed to determine one or more fifth features 528 associated with a fifth emotion. In some examples, the first client device 564 may record the fifth video for performing a fifth video communication session using the communication service (e.g., the first user 544 may converse with one or more users via the fifth video communication session). In some examples, during a fifth period of time 526 corresponding to the fifth portion of the fifth video, the first user 544 may be associated with the fifth emotion (e.g., neutral). For example, it may be determined that the first user 544 is associated with the fifth emotion within the fifth portion of the fifth video based upon one or more of a fifth facial expression 530 associated with the first user 544 within the fifth portion of the fifth video, speech of the first user 544 within the fifth portion of the fifth video, one or more voice properties of the first user 544 within the fifth portion of the fifth video (e.g., the first user 544 may speak in a monotonous way), etc. In some examples, the fifth portion of the fifth video may be analyzed to determine the one or more fifth features 528 of the first user 544 within the fifth portion of the fifth video associated with the fifth emotion. The one or more fifth features 528 may comprise one or more fifth audio features of the first user 544 (e.g., one or more of the speech, a transcription of the speech, one or more voice properties of sound of the first user 544 within the fifth portion of the fifth video, etc.) and/or one or more fifth visual features of the first user 544 (e.g., one or more of the fifth facial expression 530 of the first user 544 within the fifth portion of the fifth video, a position of a head of the first user 544, one or more movements of one or more body parts of the first user 544, etc.). In some examples, a fifth set of features, of the plurality of sets of features, associated with the fifth emotion may be generated (and/or updated) based upon the one or more fifth features 528.

Figure 5F:
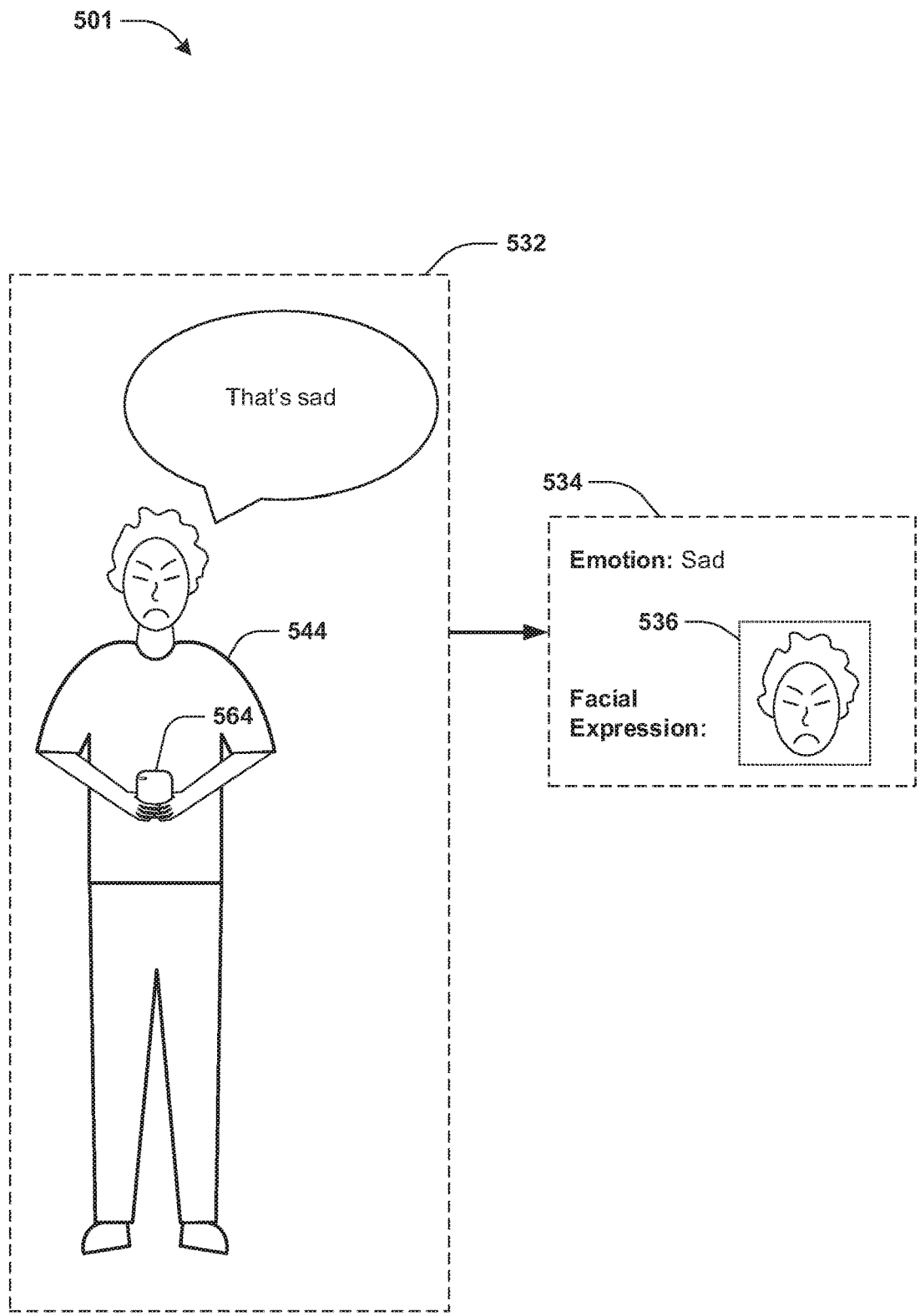
FIG. 5F is a diagram illustrating an exemplary system for determining an emotion of a user and/or presenting a representation of the emotion, where a sixth portion of a sixth video associated with a first user is analyzed to determine one or more sixth features associated with a sixth emotion.

FIG. 5F illustrates a sixth portion of a sixth video associated with the first user 544 being analyzed to determine one or more sixth features 534 associated with a sixth emotion. In some examples, the first client device 564 may record the sixth video for performing a sixth video communication session using the communication service (e.g., the first user 544 may converse with one or more users via the sixth video communication session). In some examples, during a sixth period of time 532 corresponding to the sixth portion of the sixth video, the first user 544 may be associated with the sixth emotion (e.g., sad). For example, it may be determined that the first user 544 is associated with the sixth emotion within the sixth portion of the sixth video based upon one or more of a sixth facial expression 536 associated with the first user 544 within the sixth portion of the sixth video, speech of the first user 544 within the sixth portion of the sixth video (e.g., the first user 544 may say "That's sad", which may be associated with the sixth emotion), one or more voice properties of the first user 544 within the sixth portion of the sixth video, etc. In some examples, the sixth portion of the sixth video may be analyzed to determine the one or more sixth features 534 of the first user 544 within the sixth portion of the sixth video associated with the sixth emotion. The one or more sixth features 534 may comprise one or more sixth audio features of the first user 544 (e.g., one or more of the speech, a transcription of the speech, one or more voice properties of sound of the first user 544 within the sixth portion of the sixth video, etc.) and/or one or more sixth visual features of the first user 544 (e.g., one or more of the sixth facial expression 536 of the first user 544 within the sixth portion of the sixth video, a position of a head of the first user 544, one or more movements of one or more body parts of the first user 544, etc.). In some examples, a sixth set of features, of the plurality of sets of features, associated with the sixth emotion may be generated (and/or updated) based upon the one or more sixth features 534.

Figure 5G:
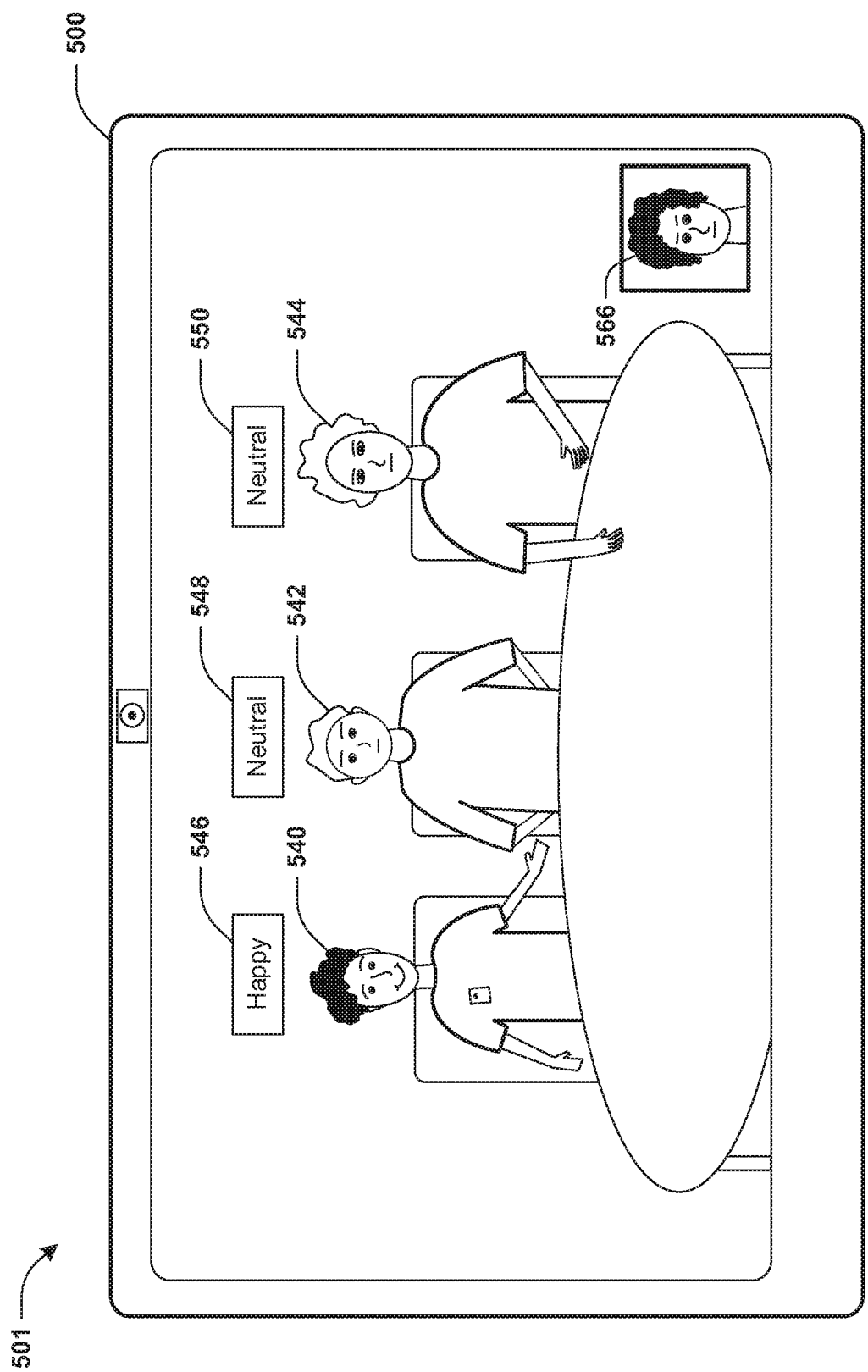
FIG. 5G is a diagram illustrating an exemplary system for determining an emotion of a user and/or presenting a representation of the emotion, where a seventh video is displayed via a second client device associated with a second user.

FIG. 5G illustrates a seventh video being displayed via a second client device 500 (e.g., a laptop) associated with a second user 566. In some examples, the seventh video may be recorded by and/or received from a third client device. Alternatively and/or additionally, an eighth video may be recorded by and/or received from the second client device 500. For example, the eighth video may be displayed via the third client device. In some examples, the seventh video and/or the eighth video may correspond to a seventh video communication session. The third client device may be the same as the first client device 564. Alternatively and/or additionally, the third client device may be different than the first client device 564.

In some examples, the seventh video may comprise multiple users comprising the first user 544, a third user 542 and/or a fourth user 540. In some examples, the first user 544, the second user 566, the third user 542 and/or the fourth user 540 may converse and/or communicate (with each other) via the seventh video communication session. The seventh video may be analyzed, using one or more of the techniques presented herein, to identify the multiple users within the seventh video. In some examples, the third user 542 may be associated with a second user emotion profile and/or the fourth user 540 may be associated with a third user emotion profile.

In some examples, emotions associated with the multiple users may be determined by analyzing the seventh video. For example, a first portion of the seventh video may be analyzed to determine one or more seventh features associated with the first user 544 within the first portion of the seventh video. In some examples, the first user emotion profile associated with the first user 544 may be analyzed based upon the one or more seventh features to determine that the first user 544 is associated with the fifth emotion (e.g., neutral). Alternatively and/or additionally, a first graphical object 550 corresponding to a representation of the fifth emotion may be displayed via the second client device 500 (e.g., the first graphical object 550 may be overlaid onto the seventh video).

Alternatively and/or additionally, the first portion of the seventh video may be analyzed to determine one or more eighth features associated with the third user 542 within the first portion of the seventh video. In some examples, the second user emotion profile associated with the third user 542 may be analyzed based upon the one or more eighth features to determine that the third user 542 is associated with the fifth emotion (e.g., neutral). Alternatively and/or additionally, a second graphical object 548 corresponding to a representation of the fifth emotion may be displayed via the second client device 500 (e.g., the second graphical object 548 may be overlaid onto the seventh video).

Alternatively and/or additionally, the first portion of the seventh video may be analyzed to determine one or more ninth features associated with the fourth user 540 within the first portion of the seventh video. In some examples, the third user emotion profile associated with the fourth user 540 may be analyzed based upon the one or more ninth features to determine that the fourth user 540 is associated with the second emotion (e.g., happy). Alternatively and/or additionally, a third graphical object 546 corresponding to a representation of the second emotion may be displayed via the second client device 500 (e.g., the third graphical object 546 may be overlaid onto the seventh video).

Figure 5H:
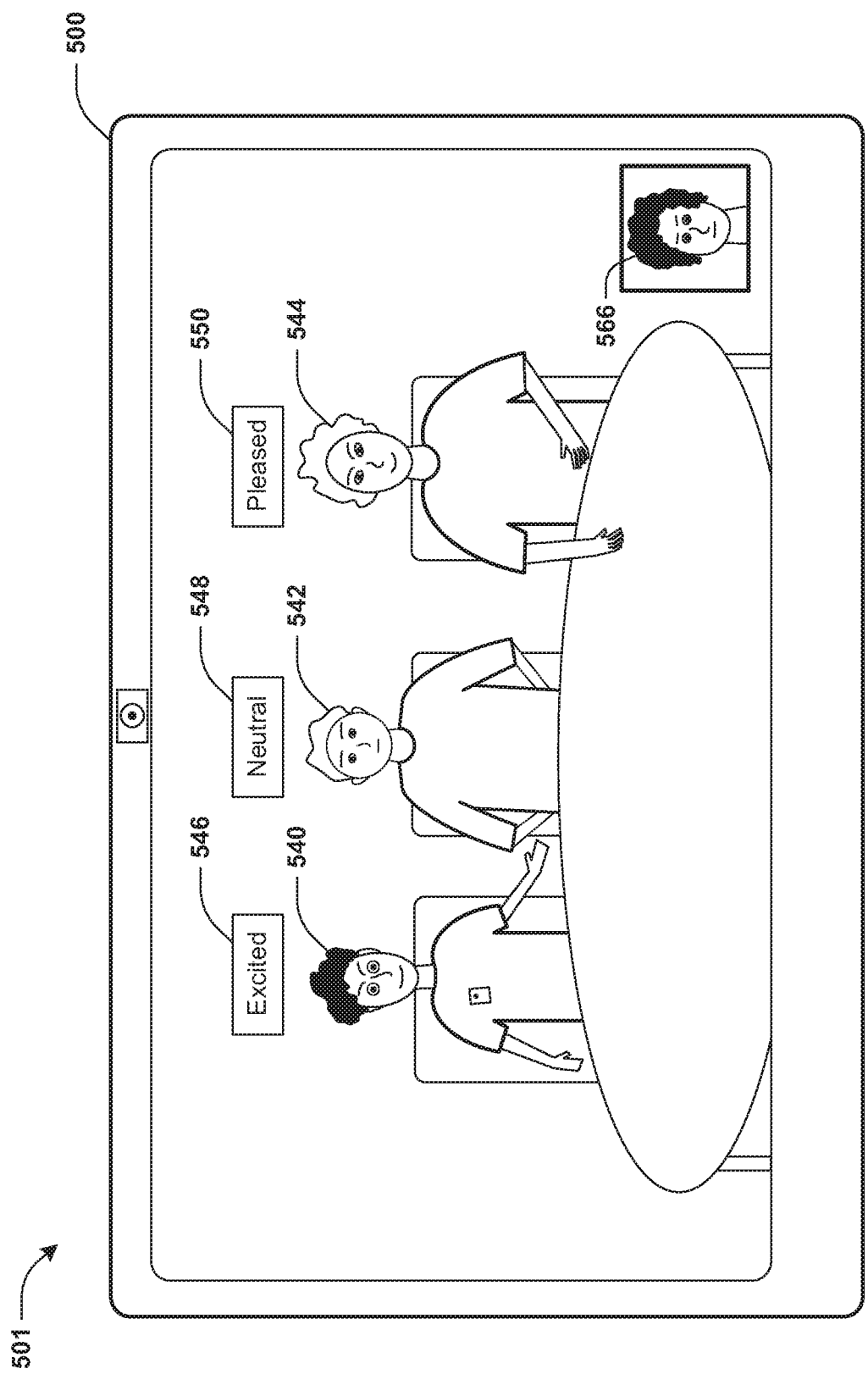
FIG. 5H is a diagram illustrating an exemplary system for determining an emotion of a user and/or presenting a representation of the emotion, where a first graphical object and/or a third graphical object are modified.

FIG. 5H illustrates the first graphical object 550 and/or the third graphical object 546 being modified. For example, a second portion of the seventh video may be analyzed to determine one or more tenth features associated with the first user 544 within the second portion of the seventh video. In some examples, the first user emotion profile associated with the first user 544 may be analyzed based upon the one or more tenth features to determine that the first user 544 is associated with the first emotion (e.g., pleased). Accordingly, the first graphical object 550 may be modified to be representative of the first emotion (rather than the fifth emotion).

Alternatively and/or additionally, the second portion of the seventh video may be analyzed to determine one or more eleventh features associated with the third user 542 within the second portion of the seventh video. In some examples, the second user emotion profile associated with the third user 542 may be analyzed based upon the one or more eleventh features to determine that the third user 542 is associated with the fifth emotion (e.g., neutral). Accordingly, the second graphical object 548 may not be modified.

Alternatively and/or additionally, the second portion of the seventh video may be analyzed to determine one or more twelfth features associated with the fourth user 540 within the second portion of the seventh video. In some examples, the third user emotion profile associated with the fourth user 540 may be analyzed based upon the one or more twelfth features to determine that the fourth user 540 is associated with the third emotion (e.g., excited). Accordingly, the third graphical object 546 may be modified to be representative of the third emotion (rather than the second emotion).

Figure 5I:
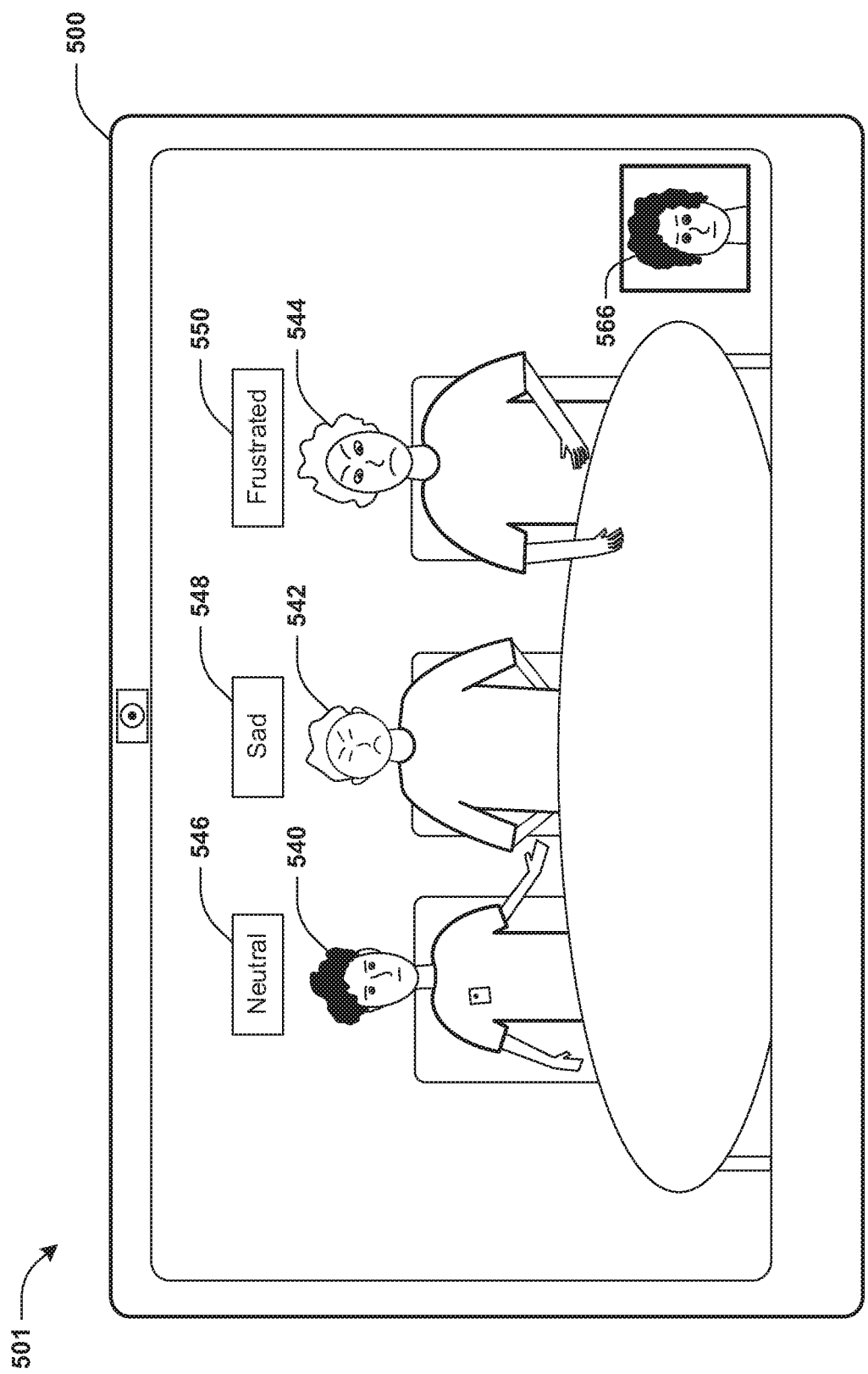
FIG. 5I is a diagram illustrating an exemplary system for determining an emotion of a user and/or presenting a representation of the emotion, where a first graphical object, a second graphical object and/or a third graphical object are modified.

FIG. 5I illustrates the first graphical object 550, the second graphical object 548 and/or the third graphical object 546 being modified. For example, a third portion of the seventh video may be analyzed to determine one or more thirteenth features associated with the first user 544 within the third portion of the seventh video. In some examples, the first user emotion profile associated with the first user 544 may be analyzed based upon the one or more thirteenth features to determine that the first user 544 is associated with the fourth emotion (e.g., frustrated). Accordingly, the first graphical object 550 may be modified to be representative of the fourth emotion (rather than the first emotion).

Alternatively and/or additionally, the third portion of the seventh video may be analyzed to determine one or more fourteenth features associated with the third user 542 within the third portion of the seventh video. In some examples, the second user emotion profile associated with the third user 542 may be analyzed based upon the one or more fourteenth features to determine that the third user 542 is associated with the sixth emotion (e.g., sad). Accordingly, the second graphical object 548 may be modified to be representative of the sixth emotion (rather than the fifth emotion).

Alternatively and/or additionally, the third portion of the seventh video may be analyzed to determine one or more fifteenth features associated with the fourth user 540 within the third portion of the seventh video. In some examples, the third user emotion profile associated with the fourth user 540 may be analyzed based upon the one or more fifteenth features to determine that the fourth user 540 is associated with the fifth emotion (e.g., neutral). Accordingly, the third graphical object 546 may be modified to be representative of the fifth emotion (rather than the third emotion).

Implementation of at least some of the disclosed subject matter may lead to benefits including, but not limited to, more accurately determining emotions of users based upon videos and/or audio. Some systems attempt to determine emotions of users based upon videos and/or audio by determining features associated with users within the videos and/or comparing the features with a (single) model. However, ways in which people express emotions vary. For example, a first individual may express their emotions, visually and/or via sound, differently than a second individual (e.g., the first individual may be of a culture and/or may have lived in an environment associated with different behaviors and/or different ways of expressing emotions as compared with a culture and/or an environment of the second individual). Accordingly, applying the same model for determining emotions of the first individual and the second individual may lead to inaccurate determinations of emotions. Thus, generating separate user emotion profiles for individuals based upon videos, images and/or audio associated with the individuals and/or using a user emotion profile associated with an individual for determining emotions of the individual may lead to more accurate determinations of the emotions of the individual.

It may be appreciated that the disclosed subject matter may assist a first user (and/or a client device associated with the first user) in determining an emotion of an individual associated with a video and/or audio. For example, multiple users comprising the first user may have a meeting (e.g., a business meeting) and/or converse with each other via a video communication session. One or more representations of one or more user emotions may be displayed via a communication interface such that the first user may determine the one or more user emotions of one or more users based upon the one or more representations of the one or more user emotions. In an example where the first user is one or more of speaking, presenting an idea and/or trying to impress the one or more users (e.g., potential clients) the first user may use the one or more representations of the one or more user emotions as feedback to determine how to proceed and/or behave in the video communication session, even an instance where the one or more users are associated with a culture different than a culture of the first user and/or express their emotions differently than the first user.

Implementation of at least some of the disclosed subject matter may lead to benefits including, but not limited to, a reduction in screen space and/or an improved usability of a display (e.g., of the client device) (e.g., as a result of enabling the first user to automatically view the one or more representations of the one or more user emotions associated with the one or more users, etc.).

In some examples, at least some of the disclosed subject matter may be implemented on a client device, and in some examples, at least some of the disclosed subject matter may be implemented on a server (e.g., hosting a service accessible via a network, such as the Internet).

Figure 6:
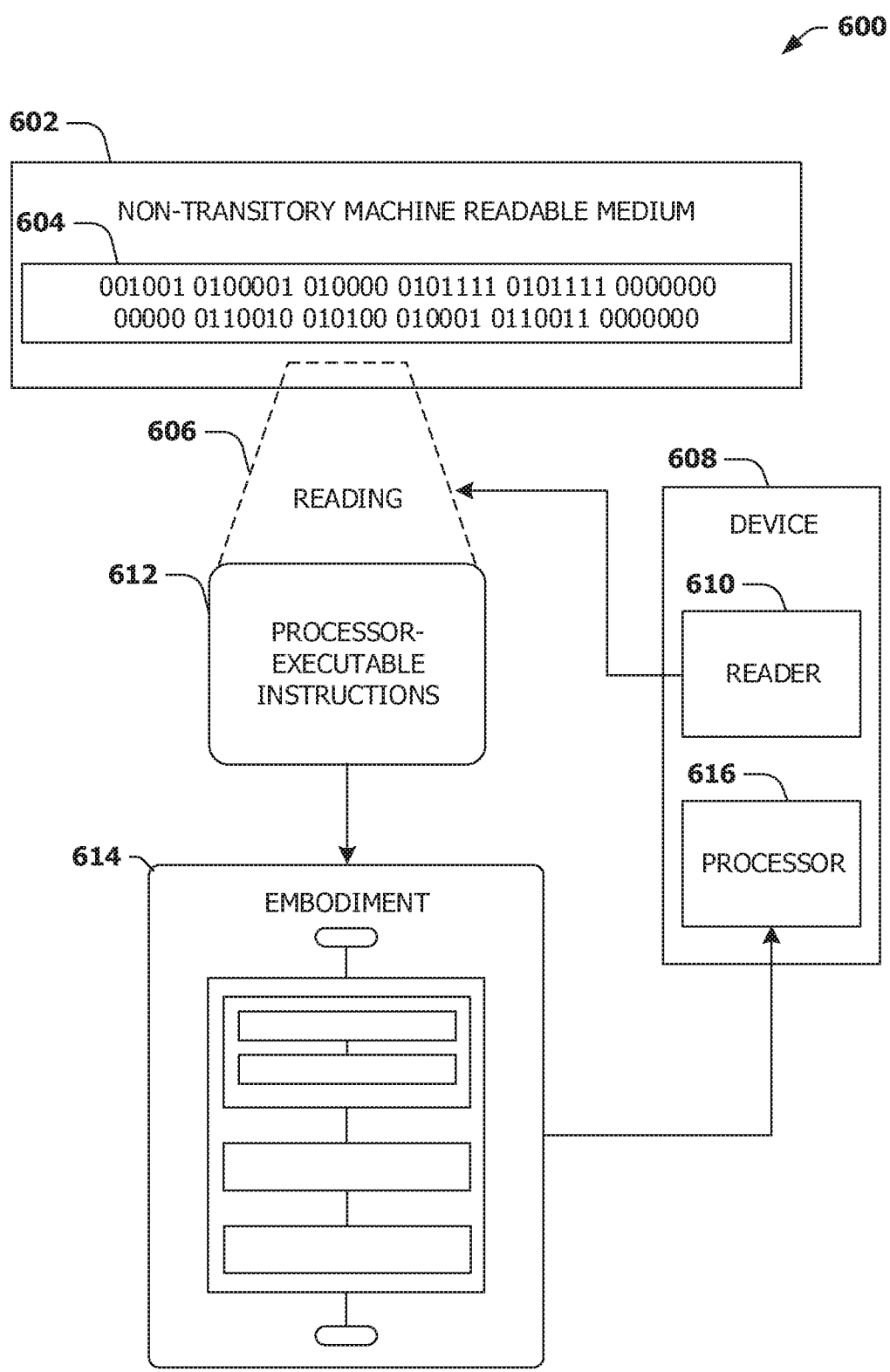
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIG. 4, for example. In some embodiments, the processor-executable instructions 612 are configured to cause implementation of a system, such as at least some of the exemplary system 501 of FIGS. 5A-5I, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
    analyzing one or more first videos associated with a first user to determine:
        a first set of features of the first user associated with a first emotion of the first user, wherein the first set of features comprises at least one of a first set of visual features of the first user or a first set of audio features of the first user; and
        a second set of features of the first user associated with a second emotion of the first user, wherein the second set of features comprises at least one of a second set of visual features of the first user or a second set of audio features of the first user;
    generating, based upon the first set of features and the second set of features, a first user emotion profile associated with the first user;
    presenting, via a graphical user interface of a first client device, a second video;
    identifying the first user and a second user within the second video;
    determining, based upon the second video and the first user emotion profile, that the first user is depicted in the second video in association with the first emotion;
    determining that the second user is depicted in the second video in association with the second emotion; and
    concurrently displaying, via the graphical user interface of the first client device, a representation of the first emotion, at least a portion of the second video depicting the first user, a second representation of the second emotion and at least a portion of the second video depicting the second user.

2. The method of claim 1, wherein the analyzing the one or more first videos comprises:
    analyzing a video of the one or more first videos;
    determining that the first user is associated with the first emotion within a first portion of the video; and
    analyzing the first portion of the video to determine one or more features of the first set of features of the first user associated with the first emotion.

3. The method of claim 2, wherein the determining that the first user is associated with the first emotion within the first portion of the video comprises:
    detecting, within the first portion of the video, speech of the first user associated with the first emotion.

4. The method of claim 2, wherein the determining that the first user is associated with the first emotion within the first portion of the video comprises:
    detecting, within the first portion of the video, a facial expression of the first user associated with the first emotion.

5. The method of claim 2, wherein the determining that the first user is associated with the first emotion within the first portion of the video comprises:
    detecting, within the first portion of the video, one or more voice properties of the first user associated with the first emotion.

6. The method of claim 1, wherein the determining that the first user is associated with the first emotion comprises:

analyzing the first user emotion profile based upon the second video to determine that one or more features of the first user in the second video are associated with the first set of features associated with the first emotion of the first user.

7. The method of claim 1, comprising:
identifying an object within the second video; and
comparing the object with visual features of the first user emotion profile to determine a visual similarity between the object and an appearance of the first user, wherein the identifying the first user within the second video is performed based upon the visual similarity.

8. The method of claim 1, comprising:
identifying speech within the second video; and
comparing the speech with audio features of the first user emotion profile to determine a similarity between the speech and a voice of the first user, wherein the identifying the first user within the second video is performed based upon the similarity.

9. The method of claim 1, wherein the second video is a first real-time video received from a second client device, the method comprising:
receiving a second real-time video from the first client device; and
presenting the second real-time video via a second graphical user interface of the second client device.

10. The method of claim 1, wherein the second video depicting the first user and the second user is a first real-time video recorded via a camera of a second client device.

11. A computing device comprising:
a processor; and
memory comprising processor-executable instructions that when executed by the processor cause performance of operations, the operations comprising:
analyzing one or more first videos associated with a first user to determine:
a first set of features of the first user associated with a first emotion of the first user, wherein the first set of features comprises at least one of a first set of visual features of the first user or a first set of audio features of the first user; and
a second set of features of the first user associated with a second emotion of the first user, wherein the second set of features comprises at least one of a second set of visual features of the first user or a second set of audio features of the first user;
generating, based upon the first set of features and the second set of features, a first user emotion profile associated with the first user; and
providing, for concurrent display, (i) a representation of one or more emotions associated with the first user emotion profile, (ii) at least a portion of a first video depicting the first user, (iii) a second representation of one or more second emotions associated with a second user and (iv) at least a portion of the first video depicting the second user.

12. The computing device of claim 11, wherein the analyzing the one or more first videos comprises:
analyzing a video of the one or more first videos;
determining that the first user is associated with the first emotion within a first portion of the video; and
analyzing the first portion of the video to determine one or more features of the first set of features of the first user associated with the first emotion.

13. The computing device of claim 12, wherein the determining that the first user is associated with the first emotion within the first portion of the video comprises:

detecting, within the first portion of the video, speech of the first user associated with the first emotion.

14. The computing device of claim 12, wherein the determining that the first user is associated with the first emotion within the first portion of the video comprises:
detecting, within the first portion of the video, a facial expression of the first user associated with the first emotion.

15. The computing device of claim 12, wherein the determining that the first user is associated with the first emotion within the first portion of the video comprises:
detecting, within the first portion of the video, one or more voice properties of the first user associated with the first emotion.

16. The computing device of claim 11, the operations comprising:
transmitting the first user emotion profile to a client device.

17. A non-transitory machine readable medium having stored thereon processor-executable instructions that when executed cause performance of operations, the operations comprising:
receiving a first user emotion profile associated with a first user, wherein the first user emotion profile comprises:
a first set of features of the first user associated with a first emotion of the first user, wherein the first set of features comprises at least one of a first set of visual features of the first user or a first set of audio features of the first user; and
a second set of features of the first user associated with a second emotion of the first user, wherein the second set of features comprises at least one of a second set of visual features of the first user or a second set of audio features of the first user;
presenting, via a graphical user interface of a first client device, a first video;
identifying the first user and a second user within the first video;
determining, based upon the first video and the first user emotion profile, that the first user is depicted in the first video in association with the first emotion;
determining that the second user is depicted in the first video in association with the second emotion; and
concurrently displaying, via the graphical user interface of the first client device, a representation of the first emotion, at least a portion of the first video depicting the first user, a second representation of the second emotion and at least a portion of the first video depicting the second user.

18. The non-transitory machine readable medium of claim 17, the operations comprising:
identifying an object within the first video; and
comparing the object with visual features of the first user emotion profile to determine a visual similarity between the object and an appearance of the first user, wherein the identifying the first user within the first video is performed based upon the visual similarity.

19. The non-transitory machine readable medium of claim 17, the operations comprising:
identifying speech within the first video; and
comparing the speech with audio features of the first user emotion profile to determine a similarity between the speech and a voice of the first user, wherein the identifying the first user within the first video is performed based upon the similarity.

20. The non-transitory machine readable medium of claim 17, wherein the first video is a first real-time video received from a second client device, the operations comprising:
  receiving a second real-time video from the first client device; and
  presenting the second real-time video via a second graphical user interface of the second client device.

* * * * *